June 20, 1950 F. E. D'HUMY ET AL 2,511,837

COMBINED FACSIMILE TRANSMITTER RECORDER

Filed Jan. 21, 1947 14 Sheets-Sheet 1

INVENTORS
F. E. d'HUMY
H. P. CORWITH
R. D. PARROTT
F. L. O'BRIEN

BY A. A. Thomas
ATTORNEY

June 20, 1950 F. E. D'HUMY ET AL 2,511,837

COMBINED FACSIMILE TRANSMITTER RECORDER

Filed Jan. 21 1947 14 Sheets-Sheet 2

INVENTORS
F. E. d'HUMY
H. P. CORWITH
R. D. PARROTT
F. L. O'BRIEN
BY A. H. Thomes
ATTORNEY

COMBINED FACSIMILE TRANSMITTER RECORDER

Filed Jan. 21, 1947 14 Sheets-Sheet 3

INVENTORS

INVENTORS: F. E. d'HUMY
H. P. CORWITH
R. D. PARROTT
F. L. O'BRIEN

BY A. A. Thomas
ATTORNEY

June 20, 1950 F. E. D'HUMY ET AL 2,511,837

COMBINED FACSIMILE TRANSMITTER RECORDER

Filed Jan. 21, 1947 14 Sheets-Sheet 4

INVENTORS
F. E. d'HUMY
H. P. CORWITH
R. D. PARROTT
F. L. O'BRIEN
BY A. A. Thomas
ATTORNEY

COMBINED FACSIMILE TRANSMITTER RECORDER

Filed Jan. 21, 1947 14 Sheets-Sheet 5

INVENTORS: F. E. d'HUMY
H. P. CORWITH
R. D. PARROTT
F. L. O'BRIEN
BY A. A. Thomas
ATTORNEY INVENTORS
F. E. d'HUMY
H. P. CORWITH
R. D. PARROTT
F. L. O'BRIEN
BY
ATTORNEY June 20, 1950 F. E. D'HUMY ET AL 2,511,837

COMBINED FACSIMILE TRANSMITTER RECORDER

Filed Jan. 21, 1947 14 Sheets-Sheet 7

INVENTORS: F. E. d'HUMY
H. P. CORWITH
R. D. PARROTT
F. L. O'BRIEN

BY A. A. Thomas
ATTORNEY

COMBINED FACSIMILE TRANSMITTER RECORDER

Filed Jan. 21, 1947 14 Sheets-Sheet 8

INVENTORS
F. E. d'HUMY
H. P. CORWITH
R. D. PARROTT
F. L. O'BRIEN
BY A. A. Flanagan
ATTORNEY INVENTORS
F. E. d'HUMY
H. P. CORWITH
R. D. PARROTT
F. L. O'BRIEN
BY A. A. Thomas
ATTORNEY INVENTORS
F. E. d'HUMY
H. P. CORWITH
R. D. PARROTT
F. L. O'BRIEN
BY A. A. Thomas
ATTORNEY

COMBINED FACSIMILE TRANSMITTER RECORDER

Filed Jan. 21, 1947 14 Sheets-Sheet 11

INVENTORS: F. E. d'HUMY
H. P. CORWITH
R. D. PARROTT
F. L. O'BRIEN

BY A. H. Thomas
ATTORNEY

COMBINED FACSIMILE TRANSMITTER RECORDER

Filed Jan. 21, 1947 14 Sheets-Sheet 12

INVENTORS
F. E. d'HUMY
H. P. CORWITH
R. D. PARROTT
F. L. O'BRIEN
BY
ATTORNEY

INVENTORS
F. E. d'HUMY
H. P. CORWITH
R. D. PARROTT
F. L. O'BRIEN
BY A. A. Thomas
ATTORNEY INVENTORS: F. E. d'HUMY
H. P. CORWITH
R. D. PARROTT
F. L. O'BRIEN BY A. R. Thomas
ATTORNEY Patented June 20, 1950

2,511,837

UNITED STATES PATENT OFFICE 2,511,837

COMBINED FACSIMILE TRANSMITTER-RECORDER

Fernand E. d'Humy, Scarsdale, and Howard P. Corwith, New York, N. Y., and Robert D. Parrott, West New York, and Frederick L. O'Brien, Rutherford, N. J., assignors to The Western Union Telegraph Company, New York, N. Y., a corporation of New York Application January 21, 1947, Serial No. 723,322

26 Claims. (Cl. 178—6.6)

This invention is for a novel facsimile machine primarily adapted to operate as a duplicator but also capable of being used simply as a transmitter or as a recorder.

The main object of our invention is to provide a facsimile machine for quickly making duplicates of any desired subject matter appearing on a sheet, such as typewriting, maps, fashion plates, drawings, newspaper articles, or any kind of graphic record adapted for scanning in our machine.

In facsimile duplicators heretofore devised it was necessary to have at least two horizontal scanning cylinders mounted in axial alignment, one for transmitting, the other for recording. The subject sheet and the recording blank were wrapped around the outside of the cylinders. From a commercial standpoint a machine like that was objectionable for several reasons. In the first place, the tandem arrangement of the cylinders resulted in a machine of undue length, as can be seen, for example, in Fig. 2 of the O'Brien and Estes Patent No. 2,260,862, granted October 28, 1941. A machine of such proportions would not be suitable as a piece of office equipment. Then, too, the mounting of the sheets on the outside of the cylinders required care and time because the sheets had to be wrapped around the cylinders with their edges coinciding. Finally springs had to be rolled over those sheets to hold them in place.

To overcome the foregoing and other disadvantages in facsimile duplicators of prior design, we have invented a machine of that type which is compact in structure and is easily loaded with the required sheets. The principal feature of our machine comprises a vertical transparent cylinder in which the original or subject sheet and a recording blank are deposited for scanning. It is only necessary to arrange the two sheets back to back, roll them up with the original sheet on the outside and drop them into the cylinder. An optical carriage outside the cylinder scans the copy sheet and an electric stylus inside the cylinder records the scanned copy on the exposed surface of the blank. In a preferred form of our machine we use but a single motor for rotating the cylinder at high speed and operating both scanning devices at low speed. The driving connections for the scanning devices comprise a novel windlass arrangement which is far simpler and cheaper than the lead screw and half-nut drive heretofore employed for scanning.

By mounting the scanning cylinder vertical in our machine we can use a cylinder of unusual length without increasing the horizontal dimensions of the machine, which is thereby capable of handling large sheets. Since the same cylinder holds both sheets, the transmitting and recording mechanisms always operate on their respective sheets in phased relationship without the need of separate phasing connections. In other words, our machine is self-phasing so that the operator need only align the two sheets before rolling them up and he can drop them into the cylinder without further care. After loading the cylinder, the operator presses the starting button and the machine does the rest. When the duplicate is finished the machine stops itself and after removal of the scanned sheet it is ready for the next operation.

The practical advantages of our facsimile machine will be fully understood from a description of the accompanying drawings which illustrate a preferred embodiment of our invention. In these drawings.

Figure 2:
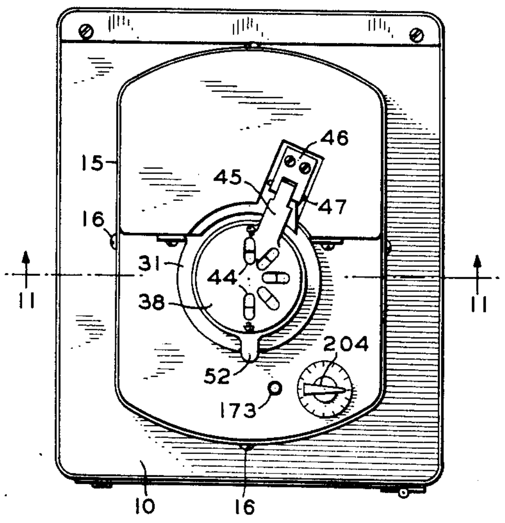
Fig. 2 is a plan view of Fig. 1.
Figure 3:
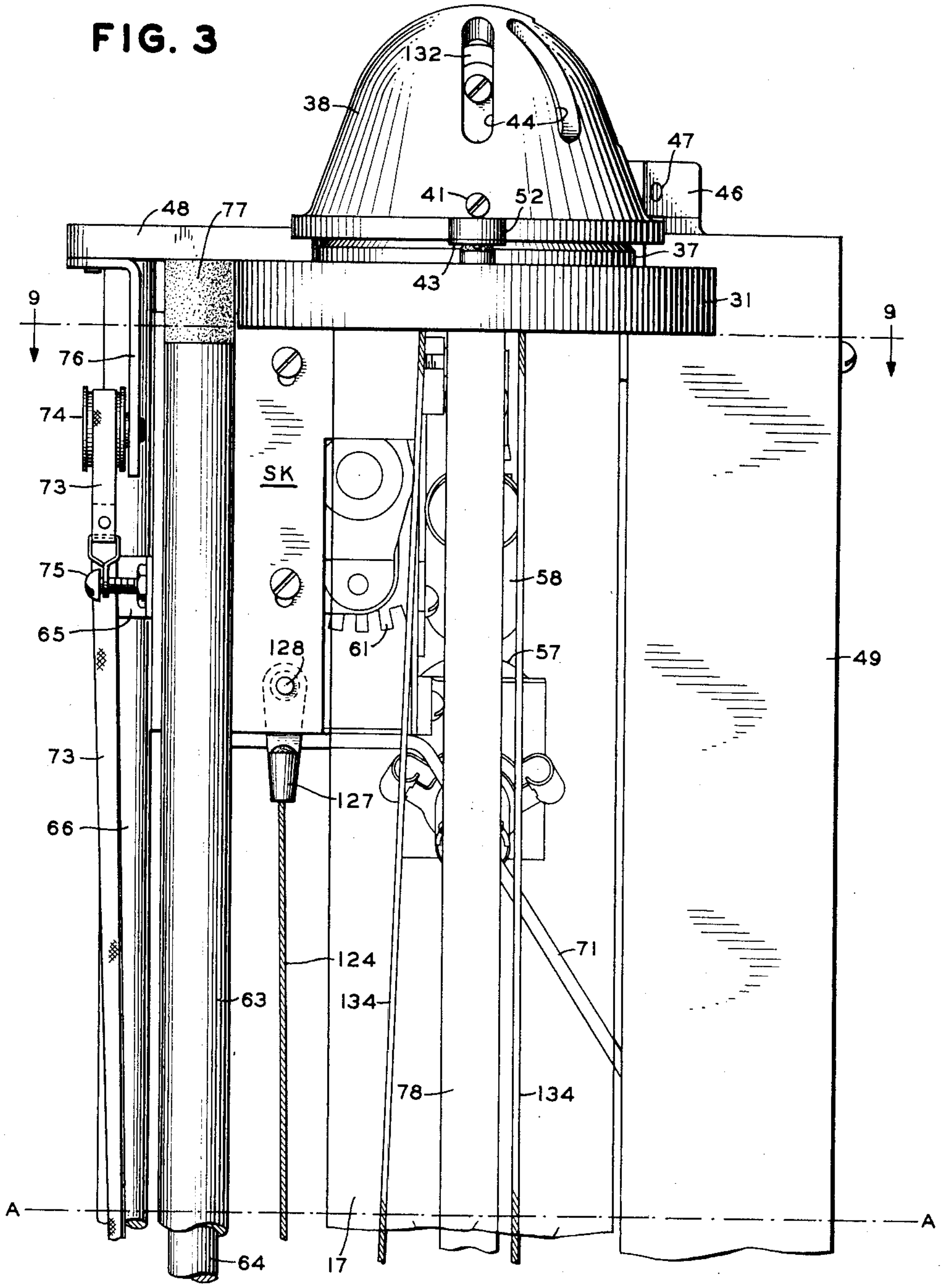
Figure 4:
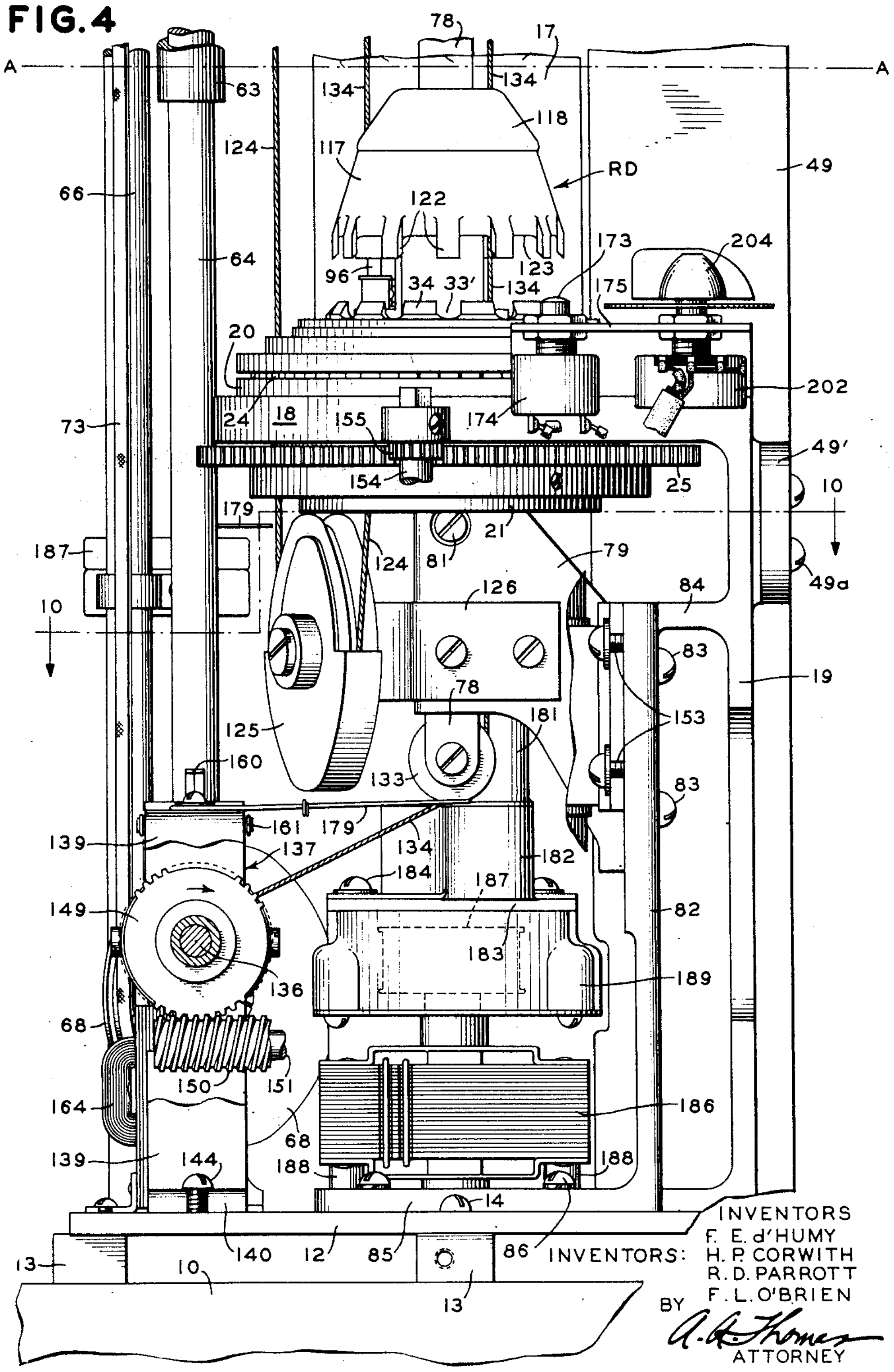
Figure 5:
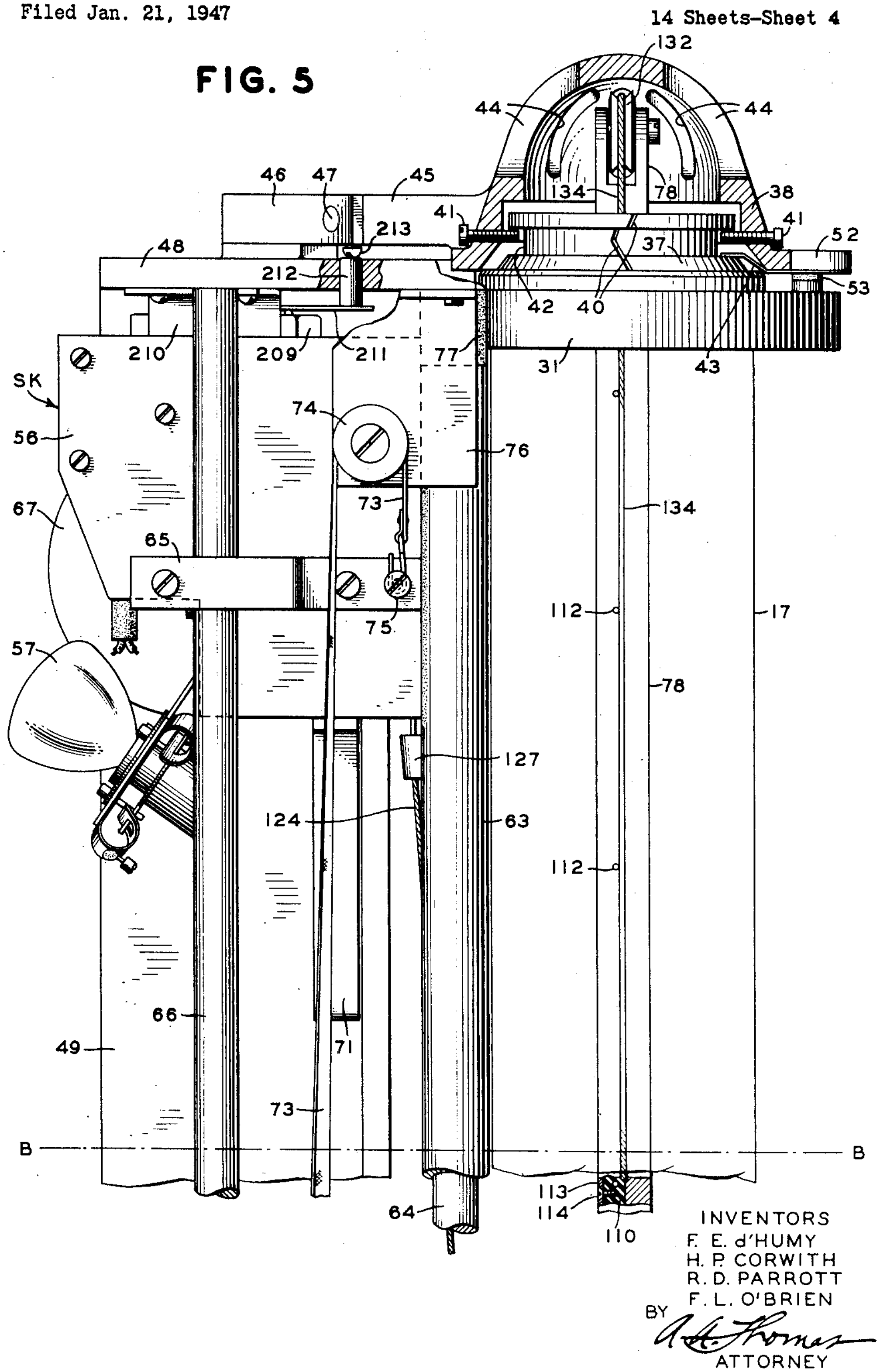
Figure 6:
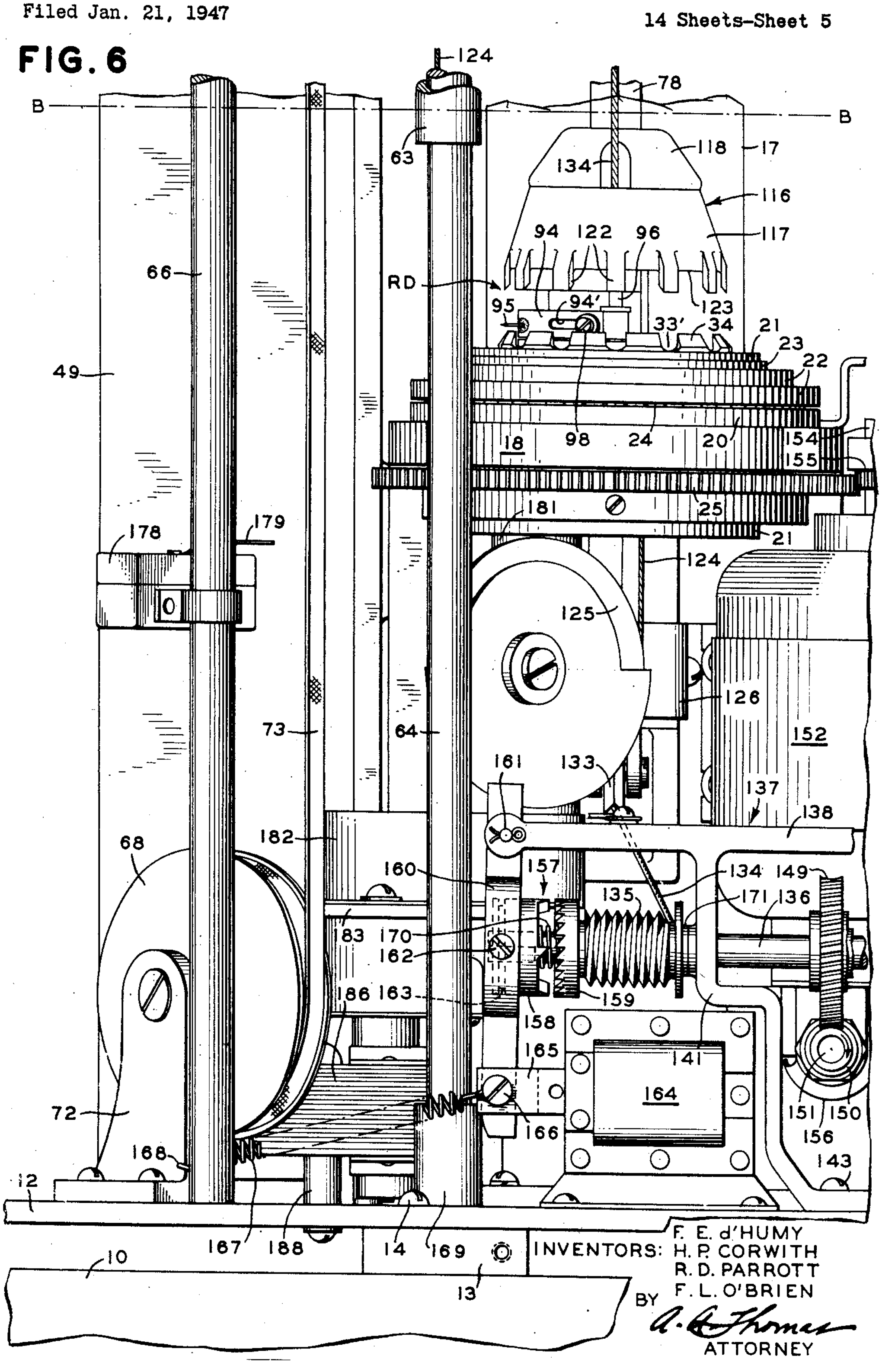
Figure 7:
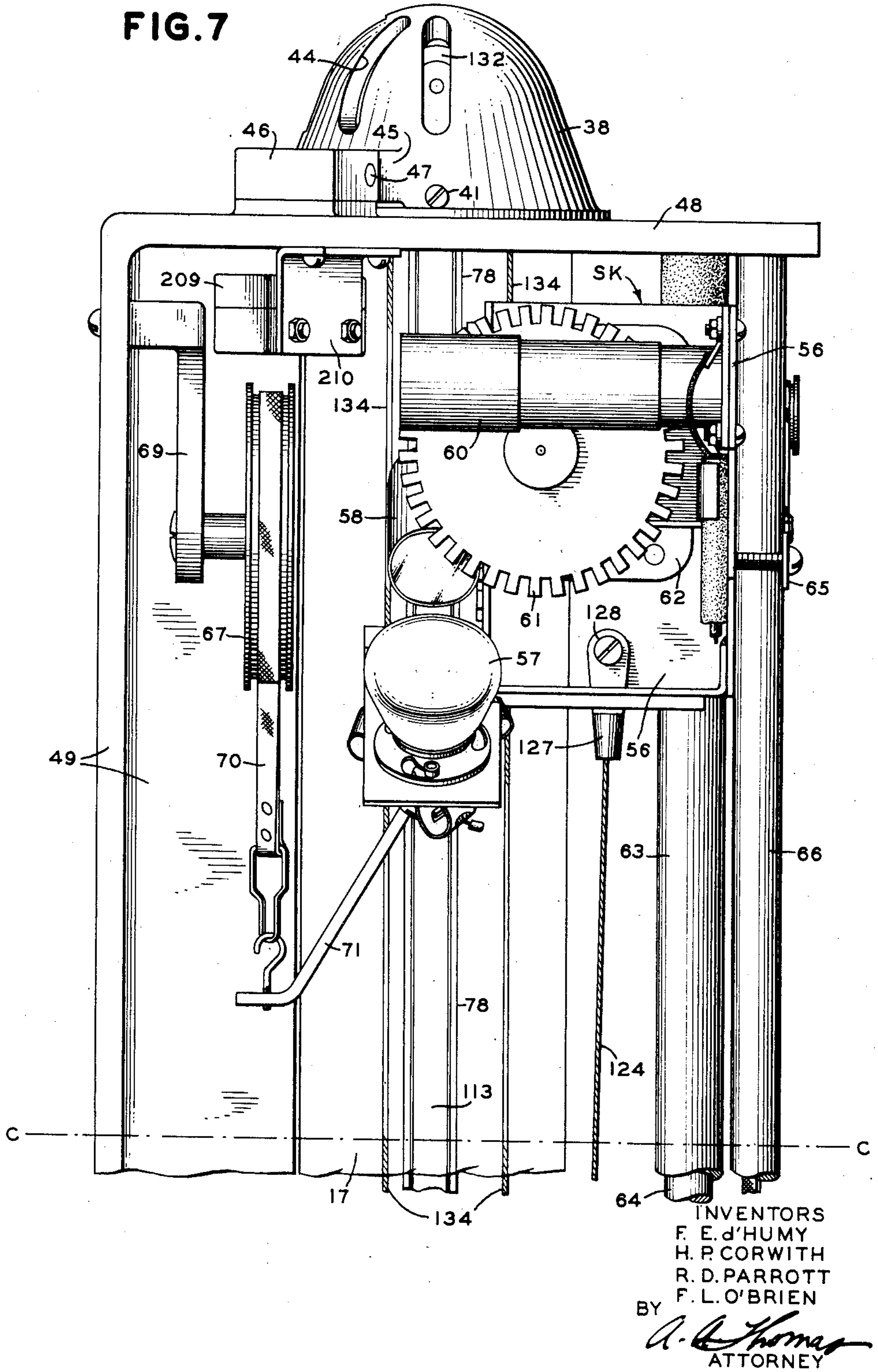
Figure 8:
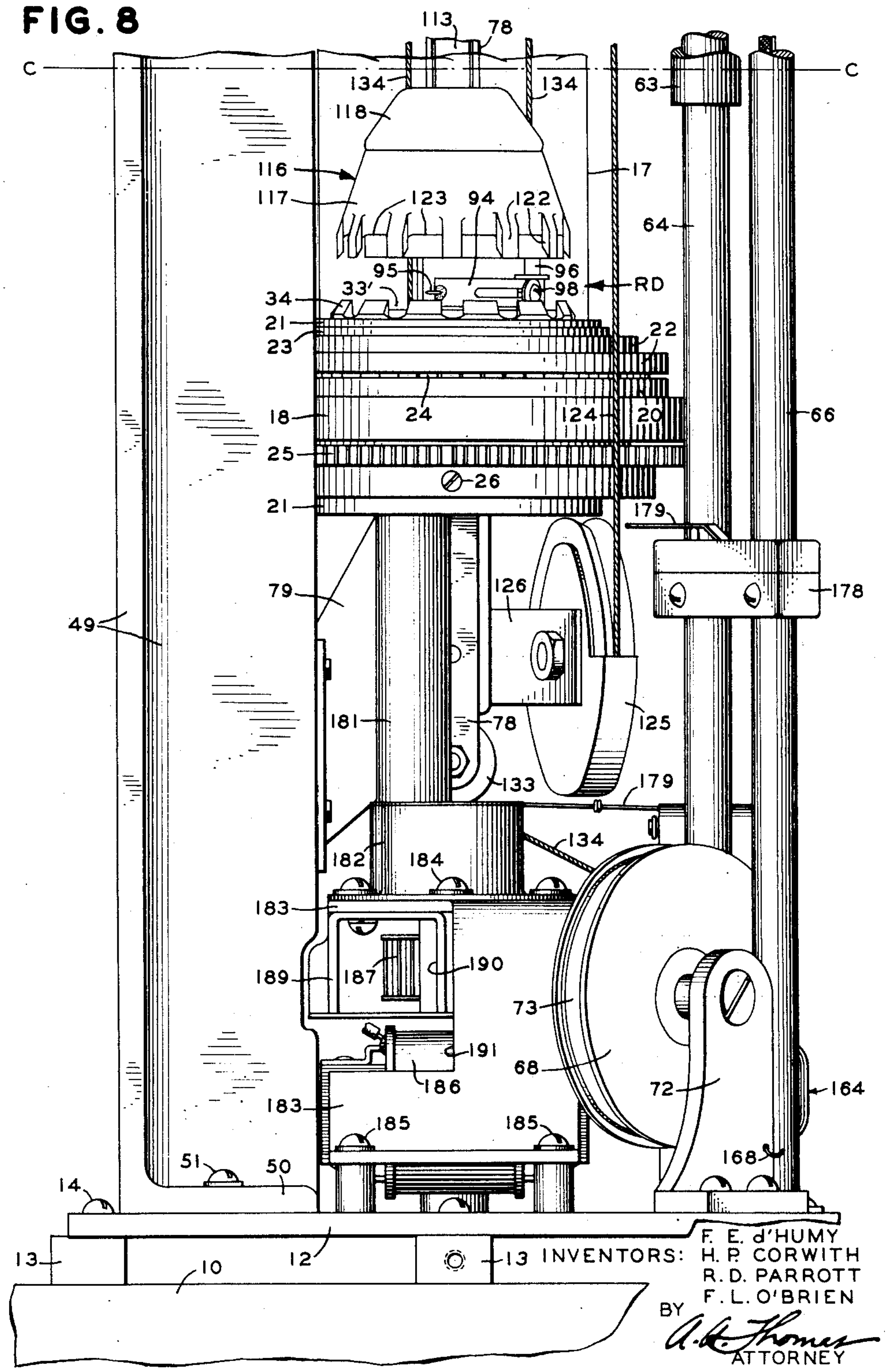
Figure 9:
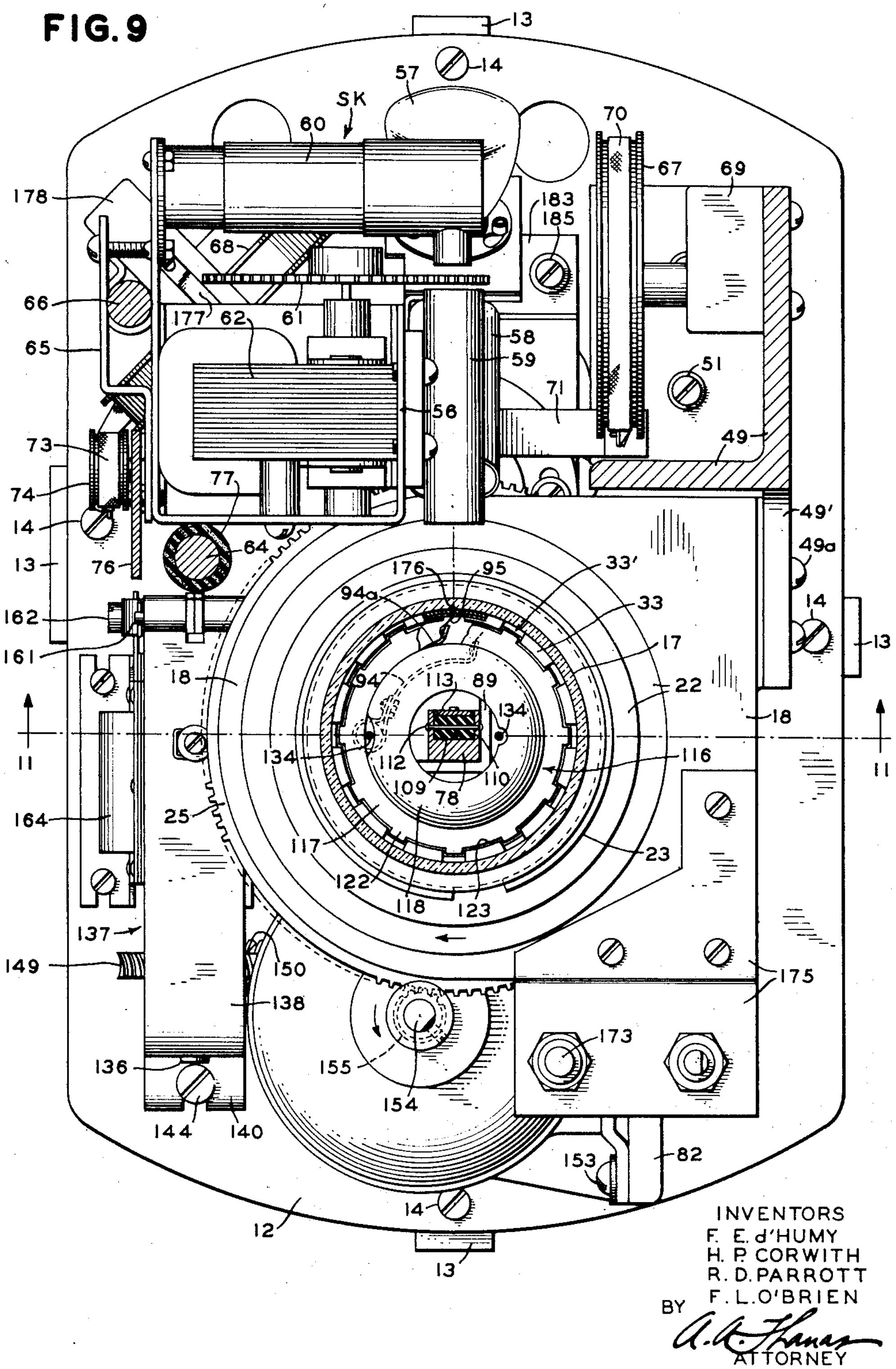
Figure 10:
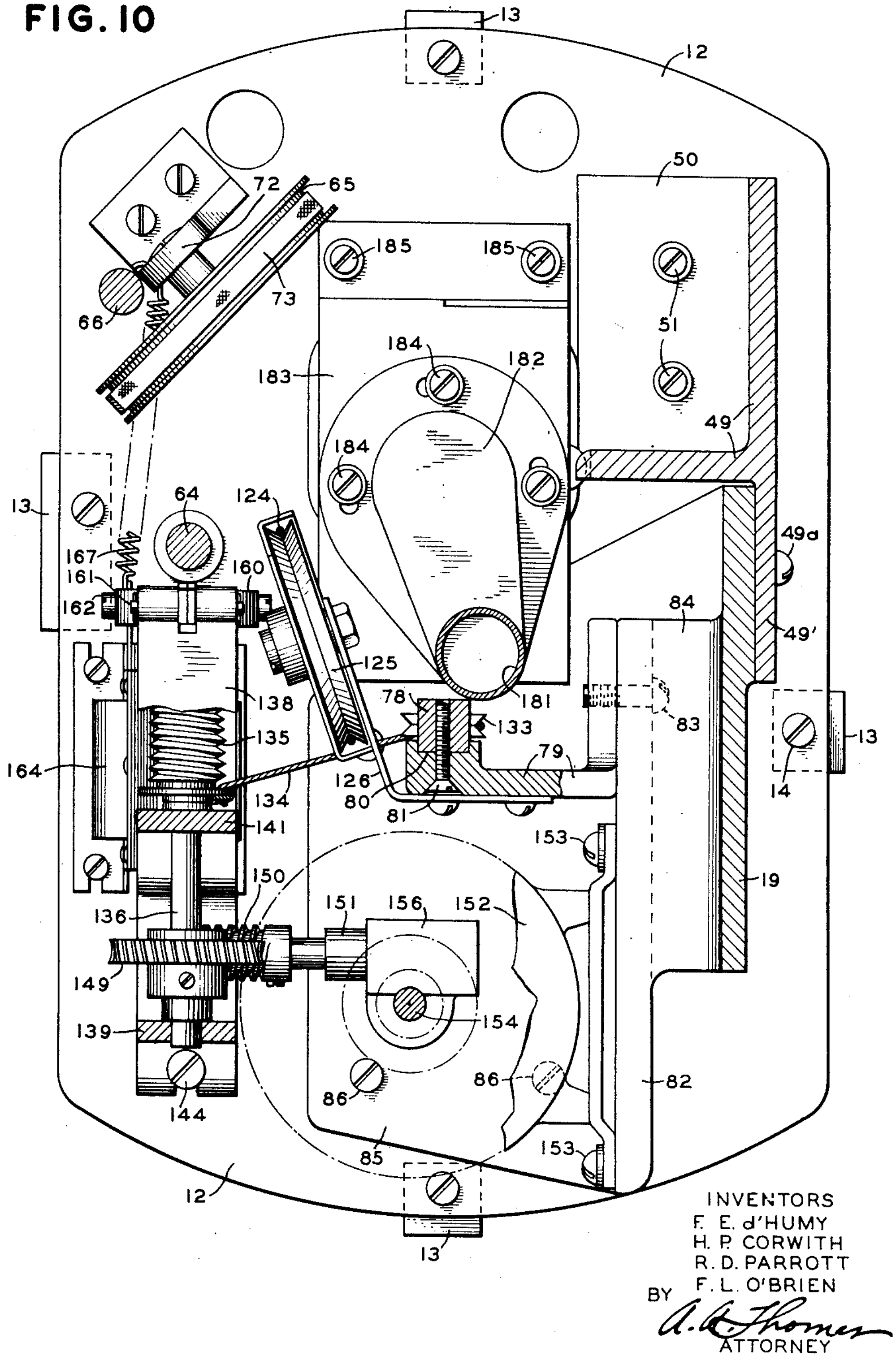
Figures 11, 11A, 11B, 11C:
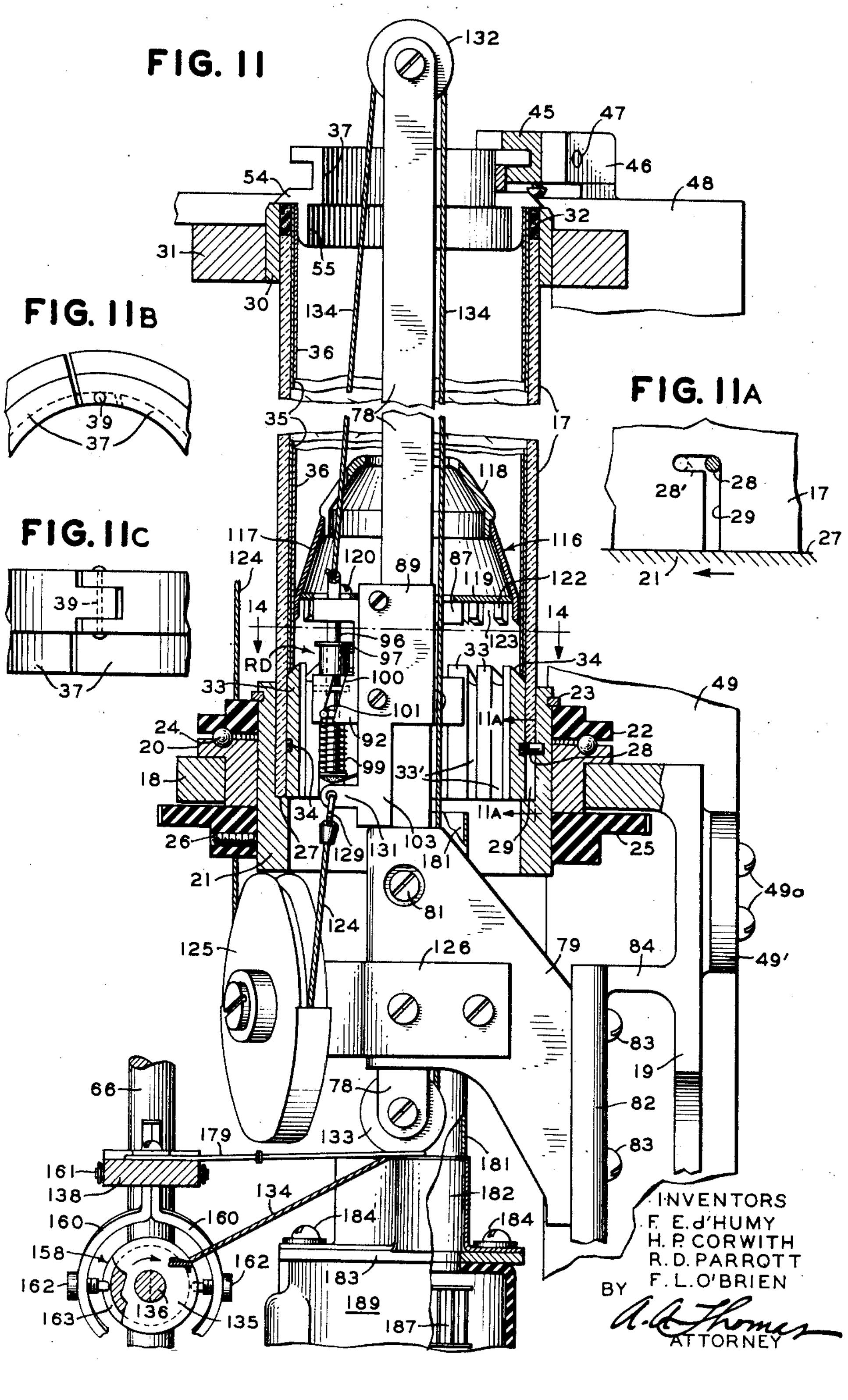
Figure 12:
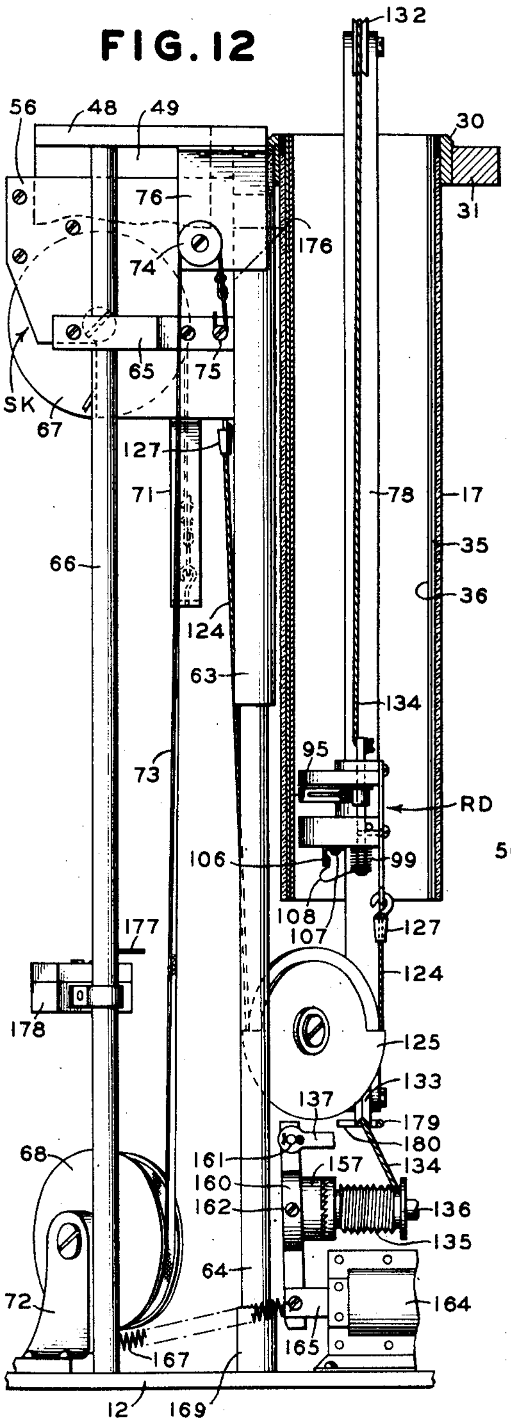
Figure 13:
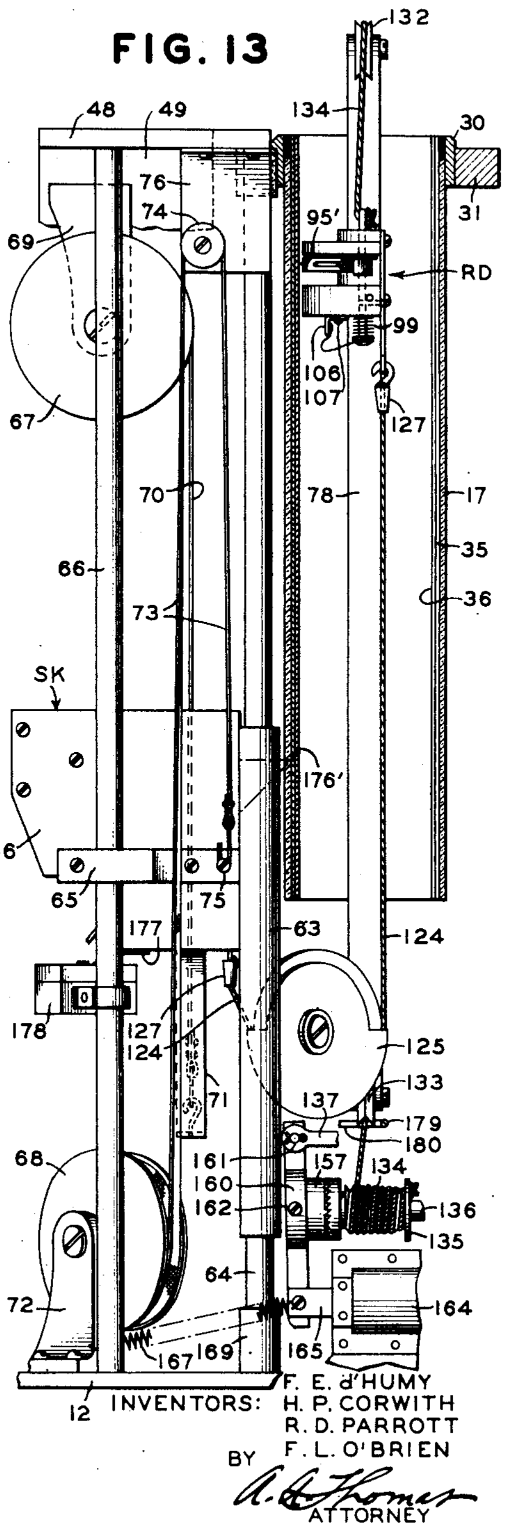
Figures 14, 15, 16, 17, 18:
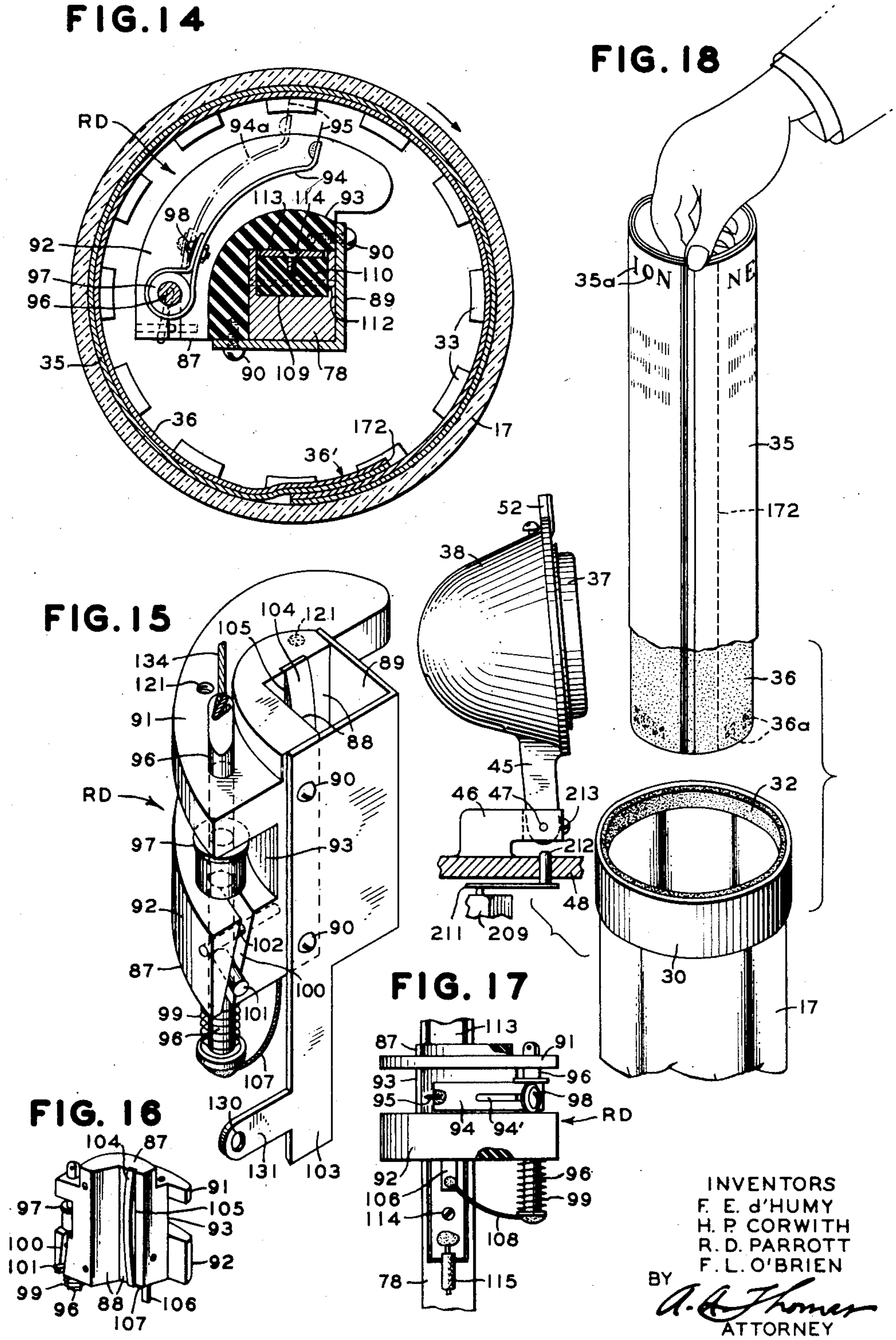
Figures 19, 20:
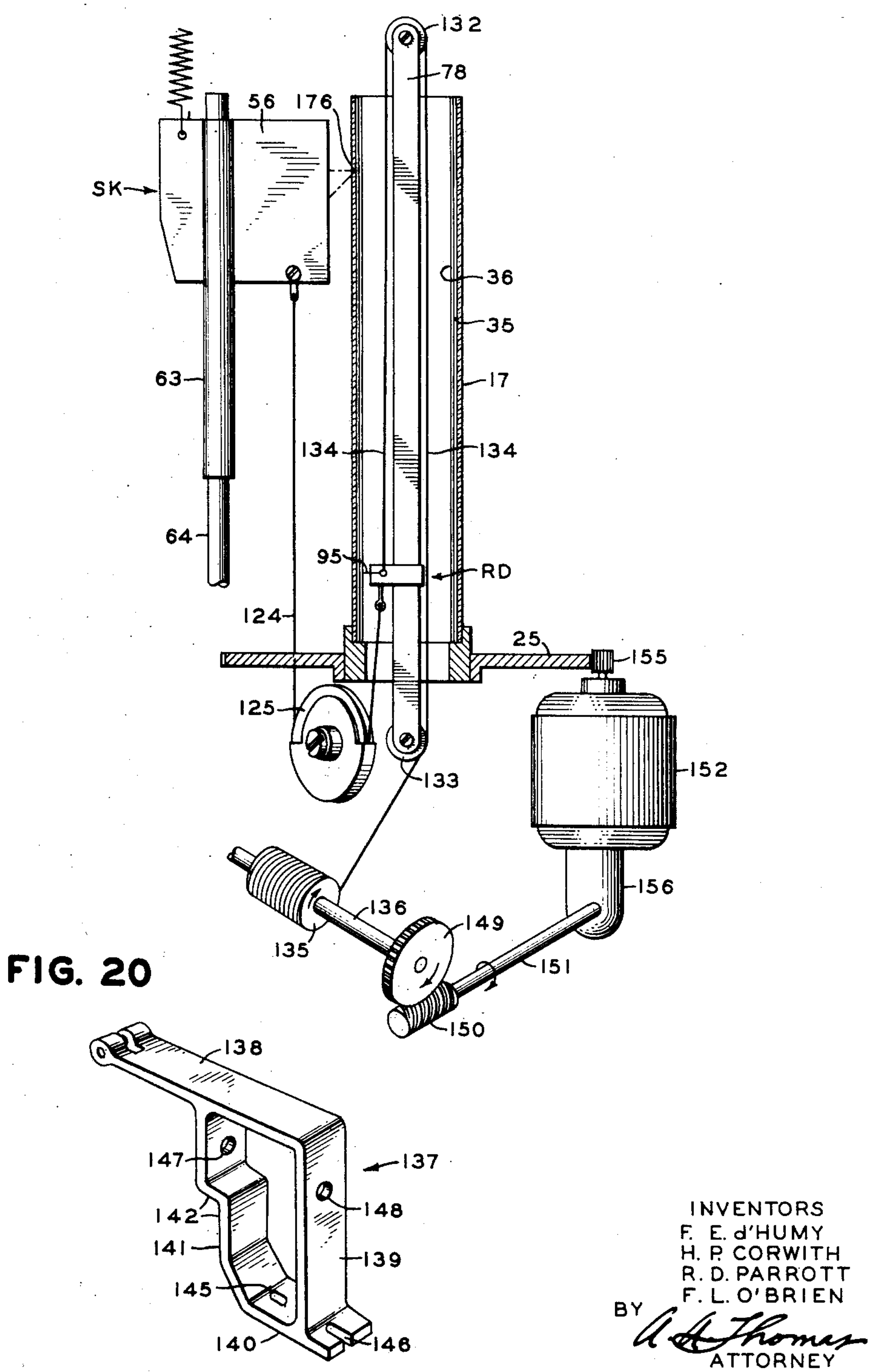

Figs. 3 and 4 together represent a front view of the inside mechanism, these two views joining along the line A—A;

Figs. 5 and 6 together show the inside mechanism as viewed from the left of the machine, these two views joining along the line B—B;

Figs. 7 and 8 together show a rear view of the mechanism, it being assumed that these two figures join along the line C—C;

Fig. 9 is a cross-section on line 9—9 of Fig. 3;

Fig. 10 is a cross-section on line 10—10 of Fig. 4;

Fig. 11 is a longitudinal section on line 11—11 of Fig. 2;

Fig. 11A shows a detail at the base of the scanning cylinder;

Figs. 11B and 11C are top and side views of a detail pertaining to the cover of the cylinder;

Figs. 12 and 13 show the positions of the two scanning devices respectively at the beginning and at the end of the scanning operation, these views being simplified for clearness;

Fig. 14 represents an enlarged cross-section on line 14—14 of Fig. 11;

Fig. 15 is a detached perspective of the recording head on the same scale as Fig. 14;

Figs. 16 and 17 show details of the recording head;

Fig. 18 illustrates how the two sheets are rolled up for insertion into the scanning cylinder;

Fig. 19 is a schematic illustration of the driving connections for the two scanning devices;

Fig. 20 shows one of the brackets used in the machine; and

Figure 21:
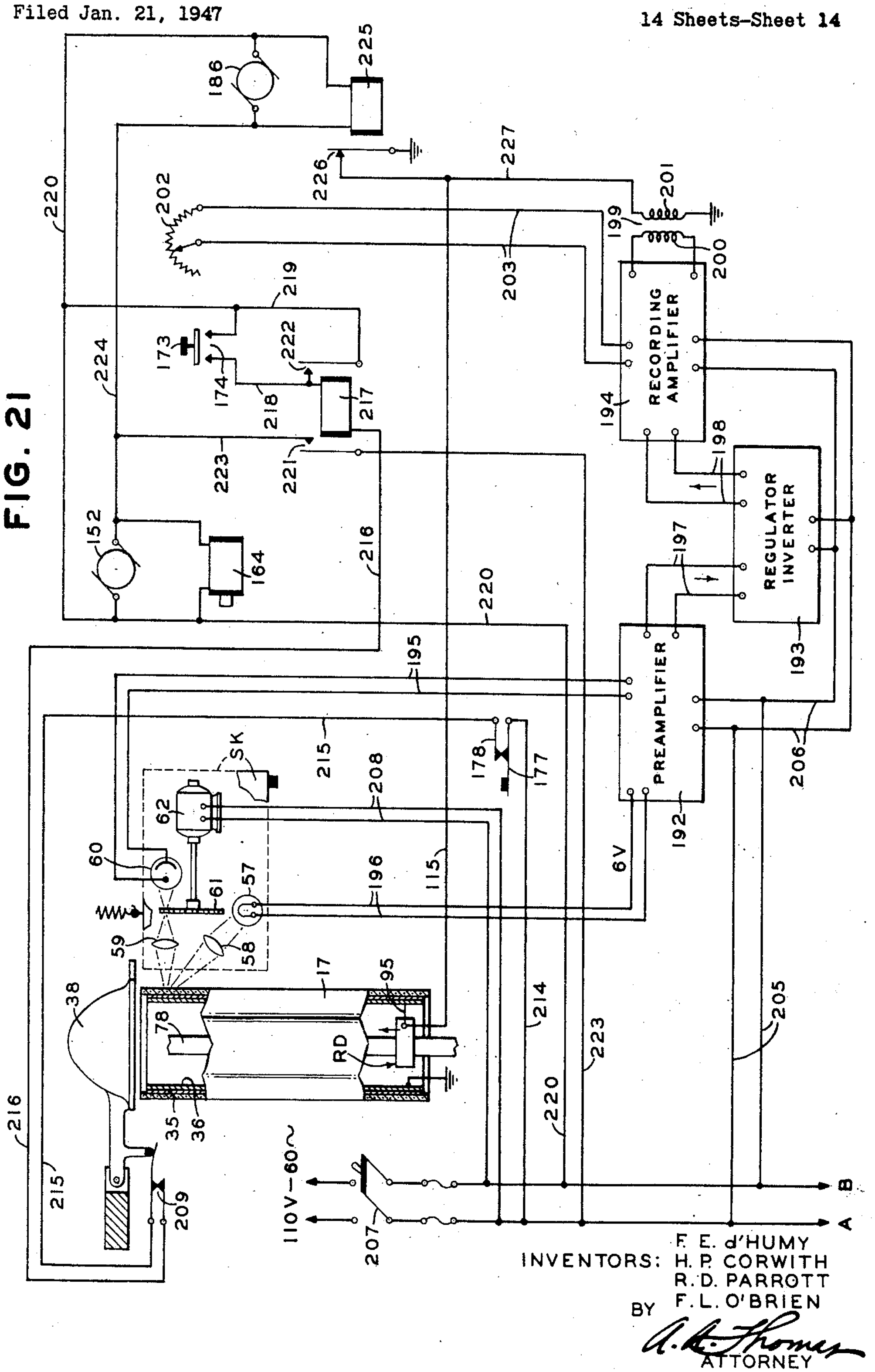

Fig. 21 is a diagram of the operational circuits of the machine.

Figure 1:
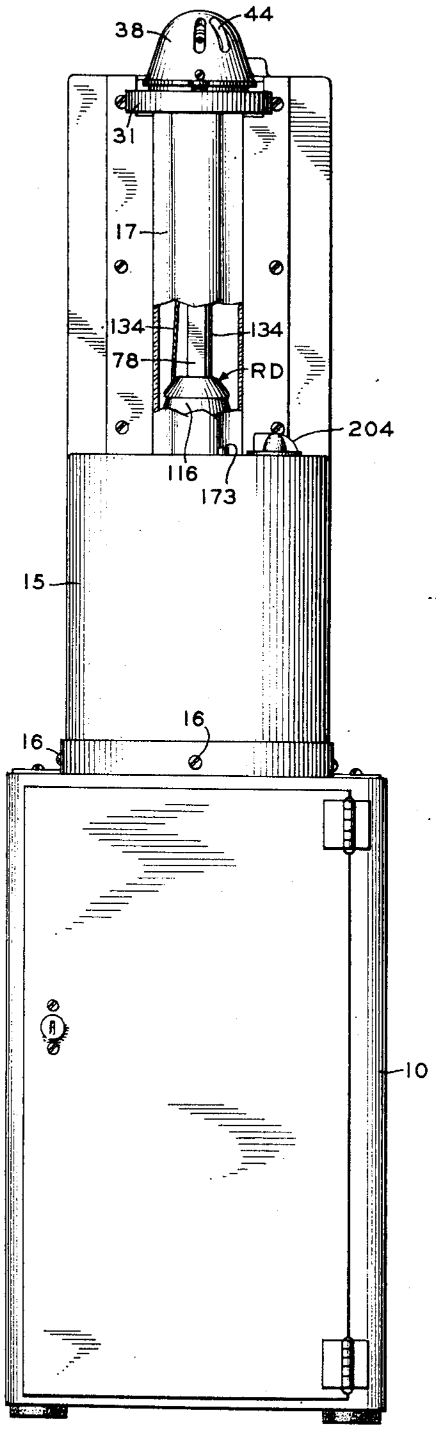
Fig. 1 is a front elevation of the complete machine.

As shown in Fig. 1, the machine is mounted on a cabinet 10 which contains the various electrical units and connections required for the circuits of Fig. 21. The operating mechanism of the machine is supported as a unit on a base plate 12 (Figs. 4 and 6) which is secured to blocks 13 on top of cabinet 10 by screws 14. This arrangement permits ready mounting and removal of the machine on and from the cabinet. A casing 15 of appropriate design is mounted on the cabinet and encloses the inside mechanism of the machine, as shown in Figs. 1 and 2. It is convenient to secure the casing 15 to the blocks 13 by screws 16 for easy removal when required.

*The vertical cylinder and its mounting*

The sheets to be scanned are placed in a vertical transparent cylinder 17 which may be of glass or any other suitable material that is optically clear. The cylinder 17 is mounted in vertical position for rapid rotation and since we prefer a cylinder of considerable length it is necessary to support it in bearings at both ends. The rotary mounting of cylinder 17 is best shown in Fig. 11 to which we shall now refer.

A horizontal plate 18 which projects from an upright support 19 carries a bushing 20 tightly fitted in place. A short sleeve or hub 21 extends through the bushing 20 and is journalled therein for rotation. A collar 22 is secured to the upper end of hub 21 over the bushing 20 by a split ring 23 or otherwise. The two annular members 20 and 22 enclose ball-bearings 24 to provide smooth easy rotation of the hub 21. To reduce the noise of operation the collar 22 may be of non-metallic material, such as Bakelite. An annular gear 25, preferably non-metallic, is secured to the lower end of hub 21 by screws 26 and forms a driving connection for the hub, as will be explained later.

The cylinder 17 fits into the rotary hub 21 and rests at its bottom edge on an annular shoulder 27 inside the hub. A pin 28 in the hub enters a bayonet slot 29 in the cylinder (see Fig. 11A) when the latter is pushed down on the shoulder 27. The cylinder may then be turned backward until it is stopped by the pin 28 or it may be left without giving it a backward twist because the initial rotation of the hub 21 will carry the pin forward to the locking position 28′. The cylinder 17 is thus firmly locked to the hub 21, yet is easily removable when necessary. It will be seen that the pin 28 acts as a direct coupling between the hub and the cylinder, so that the two always rotate as a unit.

The upper end of cylinder 17 carries a metal ring 30 which is journalled in an annular bearing member 31. The ring 30 is cemented or otherwise secured to the outer surface of the cylinder so as to project beyond the top edge of the cylinder. This projecting portion of the ring carries a friction band 32 which forms in effect a continuation of the cylinder wall. The band 32 may be of any suitable material with a friction surface, such as rubber, leather, cloth, and the like. We may also make the band 32 of metal (attached to or integral with ring 30) with its inside surface knurled or otherwise roughened to produce a frictional contact. As will be explained later, the function of the friction band 32 is to hold the upper edge of the inserted sheets against slipping when the cylinder rotates.

The base end of cylinder 17 carries on the inside a ring 33 of good conducting material, such as brass. This ring can be readily fixed in place by a suitable adhesive like shellac, and an additional binding effect is had by putting a circular groove 34 in the outer wall of the ring. After an adhesive coating has been applied to the cylinder, the tightly fitting ring 33 is forced into the cylinder and some of the adhesive will collect in the groove 34 where it will harden and form a locking joint between the cylinder 17 and the ring 33. In the present instance, the inner wall of the ring 33 is longitudinally grooved as indicated at 33′ for a purpose that will be explained in due course.

The top edge of ring 33 is bevelled to provide a peripheral groove or channel 34 which slopes downward to the cylinder wall. The function of channel 34 is to support the lower edge of the inserted paper sheets 35 and 36. Before being inserted the two sheets are lined up back to back, then rolled into a tube (see Fig. 18) and pushed down into the cylinder until the lower edges of the sheets rest in the channel 34. The slope of this channel not only guides the inserted sheets outwardly toward the cylinder wall but locks them against inward displacement.

In the present machine, the outer sheet 35 is the subject or copy bearing sheet and the inner sheet 36 is a blank on which the transmitted copy is recorded. The blank 36 may be any type of recording paper suitable for use with an electric stylus, as is well known in facsimile work. It is necessary to ground the sheet 36 during the recording operation and that ground connection is formed by the metal ring 33 which the lower edge of the sheet touches. Although the sloping channel 34 is interrupted by the grooves 33′, that does not interfere with the described functions of the metal ring 33.

The nested sheets 35 and 36 must be held firmly against the cylinder wall at their upper edges and the inner recording blank 36 should also have its upper edge grounded in addition to the lower. For this purpose we provide a heavy metal ring 37, preferably of bronze, which is carried loosely by a cover 38 (Figs. 5 and 18). The ring 37 is split into two sections which are hinged together by a pin 39 as shown in Figs. 11B and 11C. The free ends of the two ring sections are separated by an irregular line, as indicated at 40 in Fig. 5, so that the two hinged sections will overlap even when they move slightly apart. This overlapping arrangement is also used at the hinged ends of the half-rings, as shown in Fig. 11C. The split ring 37 is loosely held in the cover 38 by set screws 41 which project into an annular recess 42 of the ring, whereby the latter is free to adjust itself radially and vertically. A light spring blade 43 of brass or copper is secured to the cover 38 so as to be in constant pressure contact with the ring 37 and maintain a good ground for the same.

The dome-like cover 38 has ventilating slots 44 and is provided with an arm 45 hinged to a block 46 by a pin 47. The block 46 is mounted on a horizontal top plate 48 which extends across the machine (see Fig. 7) as part of a main supporting standard 49. As shown in Figs. 8, 9 and 10, the upright section of this standard, which may be a single casting, is a right-angled plate and the bottom piece 50 of the casting is secured to the base 12 of the machine by screws or bolts 51. For additional rigidity we provide the standard 49 with a forward extension 49′ (Figs. 4 and 10) which overlaps the vertical support 19 and is secured thereto by screws 49*a* or otherwise.

Referring to Fig. 5, the annular bearing member 31, previously described, may be an integral extension of the top plate 48 or secured thereto as a separate part. The cover 38 has a handle 52 to which the spring contact 43 may be attached. When the cover 38 is closed, the handle 52 rests on a rubber button 53 on the ring 31, this button holding the cover and the split ring 37 in horizontal position. It is desirable to have the ring 31 and the cover 38 of an attractive design because they are left exposed by the casing 15, as shown in Fig. 1, and are part of the outside appearance of the machine.

As seen in Fig. 11, the split ring 37 carried by the cover 38 has a lateral shoulder 54 and a depending cylindrical flange 55. When the cover 38 is thrown back, the top of cylinder 17 is entirely cleared for the insertion of sheets 35 and 36, as illustrated in Fig. 18. When the cover is closed down over the loaded cylinder, the split ring 37 occupies the position shown in Fig. 11, with the shoulder 54 resting on top of the cylinder and the cylindrical flange 55 just touching (or nearly touching) the inserted sheets. The ring 37 drops naturally into this position by its own weight and because of its loose mounting. When the cylinder 17 is rapidly rotated for scanning, as will presently be described, the heavy ring 37 rotates with it and the pivoted ring sections fly outward by centrifugal force, thereby pressing against the sheets 35 and 36 and holding them firmly against the friction ring 32. The overlapping portions of the spread ring sections 37 provide a continuous contact with the paper.

It should be noted in Fig. 11 that the metal ring 37 is in contact with the top edge of the electric recording sheet 36, so that the ring forms a ground for the sheet at that end. The inner sheet 36 is therefore effectively grounded at both ends for the most satisfactory results of the recording operation. It is clear that the ring 37 performs the dual function of clamping the sheets tight against the rotating cylinder and acting as a ground connection for the recording circuit.

*The optical scanning mechanism*

The outer sheet 35, as previously pointed out, bears the subject matter to be duplicated on the inner blank 36. The rolled up nested sheets are so inserted that the copy on sheet 35 is right side up and on the outside of the paper tube, as represented in Fig. 18. The copy is scanned optically through the cylinder wall from the top down while the cylinder 17 rotates in a clockwise direction.

A scanning carriage indicated as a unit by SK is arranged at the back of the machine to slide downward slowly behind the rotating cylinder 17 while directing a spot of light against the copy sheet 35. Since the scanning carriage SK is substantially like the scanning carriage disclosed in the pending application of Wise et al., Ser. No. 650,074, now Patent No. 2,503,311, granted April 11, 1950, we need not describe it in detail. It will be sufficient to say that this unit comprises a U-shaped sheet metal frame 56 (Fig. 9) on which are mounted the usual parts of an optical scanner, namely, an exciter lamp 57, a condensing tube 58, a pickup tube 59, a photocell 60, a chopper disk 61, and a small synchronous motor 62 for driving the disk. The functions and operative relation of those parts are so well known as to require no further particulars.

To the front wall of the carriage frame 56 is secured a long sleeve 63 which slides on a rod 64 supported between the base 12 and the top plate 48. The sleeve 63 is preferably welded to the carriage frame. To prevent twisting of the carriage in its movements we provide the same with a side bracket 65 (Figs. 5 and 9) arranged to enclose a vertical guide rod 66 in a snug slidable fit. The guide rod 66 is behind the rod 64 and extends between the base 12 and the top plate 48.

The scanning carriage SK is normally held in uppermost or starting position by a pair of spring drums 67 and 68 which are of well known construction and therefore require no description. The upper spring drum 67 is pivoted on a bracket 69 (Fig. 7) which is attached to the vertical plate 49. A cord or tape 70 wound on the drum 67 is connected to a slanting arm 71 which projects from the carriage frame 56. The lower spring drum 68 is pivoted on a bracket 72 mounted on the base 12 (Fig. 8). A cord or tape 73 wound on drum 68 passes upward over a pulley 74 (Figs. 3 and 5) and is connected to the carriage frame by a pin or screw 75. The pulley 74 is mounted on a bracket 76 depending from the top plate 48.

The springs in the drums 67 and 68 are so arranged that normally they hold the carriage SK up. When the carriage moves down during scanning (as later to be described), the cords 70 and 73 wind up the spring drums so that upon release of the carriage they quickly pull it up to starting position. A rubber buffer 77 on the upper end of rod 64 forms a silent stop for the carriage. Having the drum connections on opposite sides of the carriage frame 56 causes the latter to slide smoothly up and down.

*The electric recording head*

The inner surface of the recording sheet 36 is scanned by an electric head of novel construction mounted inside the cylinder 17. It will be convenient to identify this recording head as a unit by the letters RD. Referring to Fig. 11, the recording head slides up and down on a fixed metal post 78 extending centrally through the cylinder 17 and supported independently thereof. The post 78 is square or rectangular in cross-section to prevent turning of the recording head thereon. As shown in Figs. 10 and 11, the lower end of post 78 is fixed on a bracket 79 which has a recess 80 for receiving the post in a tight fit. One or more screws 81 hold the post rigidly in place.

The bracket 79 projects laterally from a vertical plate 82 to which it is fastened by screws 83. The plate 82 is here shown as part of a casting which also includes the upright wall 19 and the horizontal plate 18 projecting laterally therefrom to support the rotary mounting for the cylinder, as previously described. A web 84 connects the parallel upright members 19 and 82, as can be seen in Figs. 4 and 10, and a wide foot piece 85 of the casting rests on the main base 12 to which it is secured by screws 86.

Referring to Fig. 11, the fixed square post 78 extends through both ends of the rotary cylinder 17 without in any way interfering with the rotation thereof nor with the insertion and removal of the sheets. The recording head RD is so constructed as to fit snugly around the post 78 for smooth movement up and down within the cylinder. The novel structural details of the recording head are fully shown in Figs. 14 to 17 which we shall now describe.

A block 87 of insulating material, such as Bakelite, has a right angled recess 88 adapted to enclose two sides of the square post 78. A right angled metal plate 89 is secured to the block 87 by screws 90 in such position as to surround the post 78 on the two other sides, whereby the block is mounted on the post in a slidable fit with ample contact area for easy movement. The insulating block 87 has two arcuate flanges 91 and 92 spaced to form a horizontal recess or channel 93 for housing an arm 94 which carries an electric recording stylus 95.

The stylus arm 94, which is a curved blade of spring metal, is rigidly connected at its inner end to a metal pin 96 by looping the blade around a metal bushing 97 fixed on the pin and then fastening the loop by a screw 98. This manner of mounting the stylus arm 94 has two practical advantages. First, it makes it easy to adjust the normal angular position of the arm before the screw 98 is tightened. Second, it permits a quick removal of the stylus arm when a new stylus is required. A slot 94' in the arm 94 facilitates the tightening and loosening of the arm when necessary.

The pin 96 is so mounted in the flanges 91 and 92 of block 87 as to be capable of axial as well as rotary movement. An expanding coil spring 99 normally holds the pin 96 down, with the bushing 97 resting on top of the flange 92, as shown in Figs. 11 and 15. The stylus arm 94 is then in withdrawn position as shown in full lines in Fig. 14. The flange 92 has a diagonal slot 100 in which operates a cross-pin 101 carried by the pin 96. A stop pin 102 in flange 92 limits the upward movement of pin 96. An upward pull on pin 96 will not only lift it but cause it to turn in a counterclockwise direction by the camming action of slot 100. This light turning of pin 96 swings the stylus arm 94 outward into recording position, as indicated by the dotted outline 94*a* in Fig. 14. The recording head RD is supported in normal or starting position by an extension 103 on plate 89 resting on top of the bracket 79, as shown in Fig. 11.

The stylus arm 94 is maintained in the recording circuit during the movements of the recording head RD by a novel contact assembly which includes a spring blade 104 of brass or copper seated in a groove 105 in block 87 (Fig. 16). The lower end of contact blade 104 is in the form of a right-angled extension 106 (Figs. 12 and 13) which is seated against the bottom of flange 92 and secured thereto by a screw 107. A flexible conductor 108 forms an electric connection between the contact blade 104 and the pivot pin 96 on which the stylus arm 94 is mounted.

The fixed post 78 has a longitudinal recess 109 which hold an insulating filler 110, which is held in place by cross pins or rivets 112 (Figs. 9 and 14). A brass or copper strip 113 is secured to the face of filler 110 by screws 114. The outer surface of strip 113 is flush with the rear side of post 78 and constitutes an insulated structural part of the post. The spring blade 104 mounted inside the block 87 is in constant pressure contact with the insulated strip 113 as the recording head RD slides along the post 78. A conductor 115 of the recording circuit is connected to the lower end of strip 113 (Fig. 17). The stylus 95 is therefore connected to conductor 115 at all times by contact means which do not interfere with the movements of the stylus.

The recording head RD is provided with a dome-like or bell shaped cover 116 consisting of a conical base section 117 and a top section 118 removably seated on the base section. This cover is shown in Figs. 4, 6, 8, 9 and most clearly in Fig. 11. A plate 119 fixed inside the section 117 is secured to the top of block 87 by screws 120. Only one screw is shown in Fig. 11 but the position of these screws is clear from the corresponding screw holes 121 in Fig. 15. The movable top section 118 of the cover permits access to the screws 120 for mounting and demounting the cover, which is preferably of thick metal so as to give weight to the recording head. As shown in Fig. 11, the conical top section 118 and the base plate 119 have openings through which the post passes without touching any part of the metal cover 116, so that the latter is insulated and not grounded to the machine. This insulated condition of the cover 116 is necessary to prevent the recording voltage from jumping across the blank 36 to the cover.

Referring to Fig. 11, the base section 117 of the cover 116 terminates in a depending circular flange 122 which is cut away at intervals to provide grooves or channels 123. The outer surface of flange 122 touches the inner surface of the recording sheet 36 so that the nested sheets are held smooth in advance of the stylus 95 as it moves slowly up in the cylinder 17 during a recording operation. The bell-shaped cover 116 performs two other functions. It guides the rolled up sheets during insertion outwardly against the cylinder wall, and also prevents the sheets from accidentally coming into contact with the stylus 95 which normally lies within the circumference of the flange 122.

The reason for providing the grooves or channels 123 on the cover flange 122 is to permit the mounting and removal of cylinder 17 without disturbing the recording head RD. This will be understood by regarding Fig. 9 where it will be seen that the ribs and grooves in ring 33 of the cylinder will slide past the correspondingly aligned grooves and ribs in flange 122 when the cylinder is placed on or lifted off its base. The locking pin 28 on base 21 and the bayonet slot 29 in cylinder 17 (Fig. 11) are so placed as to allow the grooved ring 33 to slide past the grooved flange 122 when the pin 28 is in alignment with the vertical portion of slot 29. This makes the mounting and removal of the cylinder very simple.

*Driving connections for scanning carriage SK and recording head RD*

We have devised novel means for simultaneously operating the optical scanning carriage SK and the electric recording head RD in opposite directions along the cylinder during a scanning operation. As shown most clearly in Figs. 12, 13 and 19, the carriage SK and the recording head RD are connected together by a wire or small cable 124 which passes around a pulley 125 arranged below the cylinder 17. The pulley 125 is mounted on an angle plate 126 (Figs. 4, 8, 10 and 11), and it is convenient to attach the plate 126 to bracket 79 which supports the post 78. One end of the cable 124 is fastened to the carriage SK in any practical way, as by a depending socket 127 (Fig. 7) attached to the carriage by a pin or screw 128. The other end of cable 124 has a hook 129 which goes through an eye 130 in a lateral lug 131 of plate 89 (Figs. 11 and 15).

The fixed post 78 carries at the top and bottom a pair of pulleys 132 and 133, respectively. A cord 134 is attached at one end to the pin 96 of the recording head RD (Figs. 11 and 15). This cord goes up around the pulley 132, then down around the pulley 133, then to a drum 135 to which the other end of the cord is fastened. It goes without saying that the cover 116 of the recording head has openings for the passage of cord 134 (see Figs. 9 and 11). The drum 135 (Figs. 6 and 10) has a helical groove in which the cord 134 is wound to lift the recording head, and it should be noted that the drum is sufficiently long to require only one layer of cord to be wound up. This is shown in Fig. 13. The practical result of this single layer of cord on the drum is the winding up of the cord at the same linear speed so as to produce a uniform upward motion of the scanning head RD. It will be seen that the winding drum 135 and the flexible connections 124 and 134 constitute a simple form of winch or windlass arrangement for raising and lowering the scanning devices SK and RD.

Referring to Figs. 6, 10 and 11, the drum 135 is mounted loosely on a shaft 136 which is journaled in a bracket 137. The particular form of this bracket is shown in Fig. 20 where it will be seen that the bracket is a substantially L-shaped structure with a horizontal top bar 138, a vertical end post 139, a base section 140, and an intermediate arm 141 which connects the top with the base section. A rectangular recess 142 formed by the shape of the arm 141 makes room for a part to be described later on. The bottom piece 140 of bracket 137 rests on the main baseplate 12 to which the bracket is secured by screws 143 and 144. There is no single figure showing both screws but we may point out that the screw 143 (Fig. 6) goes into a hole 145 in Fig. 20, and the screw 144 (Fig. 9) enters a slot 146 in the bracket base 140. The rotary shaft 136 passes through aligned openings 147 and 148 of bracket 137. In other words, the drum shaft 136 is supported at one end by the post 139 and at a midway point by the arm 141.

A helical gear 149 is fixed on shaft 136 between the bracket members 139 and 141 (Fig. 10) and this gear is permanently in mesh with a helical worm or pinion 150 mounted on a cross shaft 151. An electric motor 152 is mounted in vertical position on the upright bracket plate 82 by screws 153 (Figs. 9 and 10). The upper end of the motor shaft 154 carries a pinion 155 in mesh with the gear 25 of the cylinder mounting, as shown in Figs. 4, 6 and 9. The lower end of the motor shaft goes into a reduction gear case 156 (Figs. 10 and 19) where the cross shaft 151 is connected to the motor shaft in a reduced gear ratio of predetermined degree. Since the reducing gears in case 156 are a well known drive assembly it will not be necessary to show or describe any details thereof.

Referring to Fig. 6, the winding drum 135 is connected to the motor-driven shaft 136 by a clutch 157 which comprises a toothed ring 158 slidably keyed to the shaft and a complementary toothed ring 159 fixed to the adjacent end of the drum. The slidable clutch ring 158 is operated by a yoke 160 which is pivotally mounted on the rear or inner end of bracket 137 by a pin 161. As best shown in Fig. 11, the arms of yoke 160 surround the clutch ring 158 and carry screws or pins 162 arranged to enter a peripheral groove 163 in the rotary clutch ring, whereby the latter is connected to the yoke for slidable operation. This does not interfere with the rotation of the clutch ring 158.

The pivoted clutch yoke 160 is operated by a solenoid 164 mounted on the main base 12 beneath the arm 138 of bracket 137. The rectangular recess 142 of this bracket permits the placing of solenoid 164 beneath the drum 135 (Fig. 6), thereby adding to the compactness of the machine. The core 165 of the solenoid is connected to the lower end of yoke 160 by a pin or screw 166. A contracting coil spring 167 is connected at one end to the screw 166 (or to any other part of the yoke 160) and its other end is connected at 168 to a suitable fixed support, which in this case happens to be the bracket 72. The spring 167 normally pulls the yoke 160 rearward (to the left as viewed in Fig. 6) to hold the clutch ring 158 away from the companion ring 159 on the drum 135. A suitable stop limits the movement of yoke 160 by the spring 167. In Fig. 6, the lower end of the yoke abuts against a socket 169 in which the bottom of the guide rod 64 is mounted.

In Fig. 6 we call attention to a coil spring 170 mounted on the shaft 136 between the clutch members 158 and 159. This coil spring normally expands and tends to push the drum to the right (as viewed in Fig. 6) against a fixed disk or washer 171 on the bearing arm 141 of bracket 137. The drum 135 is so mounted on shaft 136 as to have a slight sliding movement thereon sufficient to enable the coil spring 170 to push the drum against the washer 171. This pressure contact between the rotary drum 135 and the fixed washer 171 acts as a brake for the drum to prevent unwinding of the cord 134 too fast when the recording head RD descends rapidly after a scanning operation. This will be more fully understood from the detailed description set forth under the next heading.

*Operation of scanning carriage SK and recording head RD*

When the attendant of the machine rolls up the paper sheets 35 and 36 for insertion into the cylinder 17 which always rotates clockwise, he rolls them up in such a way that the sheets overlap as illustrated in Figs. 14 and 18. That is to say, the inner overlapping end 36' trails in the direction of rotation of the cylinder so that the stylus 95 can ride off the vertical shoulder 172 formed by the inner edge of the nested sheets. When the paper tube thus formed is pushed down into the cylinder 17, the bell-shaped cover 116 of the recording head RD expands the sheets radially outward and their lower edge automatically drops into the bevelled channel 34 which cooperates with the flange 122 of the cover to hold the lower portion of the sheets firmly against the inner wall of the cylinder.

If the recording sheet 36 has no heading and is entirely blank, it makes no difference which way this sheet is put in, but if it has a printed heading this comes at the bottom when the sheets are arranged for insertion, while the heading on sheet 35 is at the top. Thus, in Fig. 18 it will be seen that the copy sheet 35 is placed with its heading 35*a* on top, whereas the recording sheet 36 is inverted to have its heading 36*a* at the bottom. Let it be understood that when we refer to the sheets 35 and 36 as paper we use that term in the description and the claims in a broad sense to include any sheet material capable of receiving copy and adapted to be scanned in a facsimile machine.

Having inserted the sheets, the attendant closes the cover 38 and presses a button 173 which projects out of the casing 15, as seen in Figs. 1 and 2. The push button 173 operates a switch 174 carried by a bracket 175 (Figs. 4 and 9) which is secured to the horizontal plate 18. The circuits controlled by the cover 38 and the push button 173 will be described in connection with the circuit diagram of Fig. 21. For the present we need only say that when the starting button 173 is operated with the cover closed, the driving motor 152 and the clutch solenoid 63 are energized. Thereupon the winding drum 135 is coupled to the motor-driven shaft 136 by the closed clutch 157 and the cord 134 is slowly wound up on the drum. At the same time the cylinder 17 is rotated at high speed and the scanning begins. We shall assume that the optical mechanism of the scanning carriage SK and the electric stylus 95 of the recording head RD are in operative condition.

Looking at the schematic view of Fig. 19, we see the scanning devices SK and RD in their normal starting position. That is, the optical carriage SK starts at the point 176 near the top of the transparent cylinder 17 and the stylus 95 of the recording head RD starts near the bottom of the cylinder. As the drum 135 is rotated clockwise by the motor 152, it winds up the cord 134 and thereby raises the recording head RD, which in turn pulls down the scanning carriage SK through the cable connection 124. The transmitting device SK and the receiving device RD are thus operated simultaneously along the cylinder in opposite directions by tandem driving connections which are exceedingly simple and efficient.

As the optical scanning point 176 travels down along the copy surface of the outer sheet 35, the electric recording point 95 travels upward at the same rate along the inner surface of the blank 36. Through an electric transmission system to be explained in the description of Fig. 21 the optically scanned copy on sheet 35 is electrically recorded in facsimile on sheet 36. In the particular machine we are describing the cylinder 17 rotates at a speed of 300 R. P. M. and the two scanning devices SK and RD travel vertically at a rate representing 100 scanning lines per inch. These figures are given merely by way of example.

It should be noted (see Fig. 9) that the optical scanning point 176 and the recording point of stylus 95 operate in the same radial plane of cylinder 17. This means that the transmitting and recording devices of our machine are always in phase without the need of separate phasing mechanism. In other words, the attendant does not have to bother about placing the sheets in a certain radial position within the cylinder. He simply pushes the rolled-up sheets in without regard to where the overlapping ends may come.

The scanning devices SK and RD have each a definite length of travel which is the same for both and is sufficient to cover the entire copy surface of sheet 35. Comparing Figs. 12 and 13, it will be seen that the optical scanning point of carriage SK travels straight down from its starting position 176 in Fig. 12 to its final position 176′ in Fig. 13. The transmitting distance from 176 to 176′ and the receiving distance from 95 to 95′ are always equal. This equality of movement is assured by the connecting metal cable 124 which has a substantially constant length. On the other hand, the cord 134 which connects the recording head RD with the drum 135 may be of woven threads so as to be very flexible and wind easily on and off the drum. It would not matter at all if the cord 134 should stretch a little, for that would merely vary the distance of the connection between the drum 135 and the recording head RD without affecting the constant cable distance between the scanning devices RD and SK.

One of the practical advantages of our machine lies in the fact that the cylinder 17 can be of any required size for scanning large sheets, such as drawings and the like. So it will be evident that the distance traveled by the scanning devices SK and RD depends upon the length of cylinder 17. The machine shown in the drawings of this application was designed for standard sheets of 8 x 11 inches, so the dimensions of cylinder 17 were calculated accordingly. While the use of a larger cylinder would increase the height of the machine, it would not affect the compactness of the machine as a piece of office equipment.

When the optical scanning carriage SK reaches its final position as shown in Fig. 13, it strikes an arm 177 of a switch 178 which is mounted on the vertical guide rod 66. The position of switch 178 on this rod is readily adjusted to correspond to the final position of the scanning carriage as determined by the length of cylinder 17 in any particular design of machine. When the switch 178 is thus operated at the end of the scanning movement, the driving motor 152 and the clutch solenoid 164 are deenergized (as will be explained for Fig. 21) so that the cylinder 17 stops and the drum 135 is unclutched from the shaft 136.

The tensioned spring drums 67 and 68 instantly pull the carriage SK back to normal position and at the same time the heavy recording head RD drops by gravity (perhaps also aided by the spring drums) to the bottom of the cylinder thereby rapidly unwinding the cord 134 from the released drum 135. The brake spring 170, as previously explained, keeps the drum from spinning too fast in unwinding the cord which might otherwise become tangled. To prevent the cord 134 from jumping the pulley 133, an arm 179 is fastened to the top of bracket 137 (Fig. 4) and extends under the pulley. The tip of this arm is bent laterally to form a guide 180 (Figs. 12 and 13) which lies across the pulley to enclose the cord.

The recording blanks 36 used in this machine are of such a nature that the operation of the electric stylus produces fumes or smoke which it is desirable to remove from inside the cylinder 17. For this purpose we provide an exhaust pipe 181 (Figs. 8 and 11) which extends into the rotary cylinder support 21. The pipe 181 projects from a casing 182 which is mounted on top of an L-shaped bracket 183 by screws 184, as shown in Figs. 8 and 10, where it will be seen that the bracket 183 is fastened to the main base 12 by screws 185. Within the L-shaped bracket 183 is mounted a blower unit comprising an electric motor 186 and a suction fan 187 driven by the motor which is supported on posts 188 (Fig. 6) extending upward from the main base 12.

The frame of motor 186 carries a housing 189 for the fan 187 and this housing communicates with the exhaust pipe 181 through casing 182, as shown in Figs. 8 and 11. The fan housing 189 has an outlet 190 opposite an aperture 191 in the bracket 183. As the fan 187 rotates it draws air through the openings 44 in the cover 38 and this downward draft in the cylinder carries off the fumes through pipe 181, casing 182 and the fan outlet 190. We usually put a screen or filler in casing 182 to deodorize the fumes.

*Operational circuit diagram of Fig. 21*

The source of power for the machine is usually a 110-volt 60-cycle alternating current which is indicated in the diagram by a pair of terminals or bus bars A and B. In describing the circuits we shall use the term "wire" to mean any kind of electrical connection. The labeled rectangles 192, 193 and 194 represent respectively a pre-amplifier, a combined regulator-inverter, and a recording amplifier. These three electrical units are well known in the facsimile art and require no description. We need but briefly point out what these devices do in the operation of the machine.

The preamplifier 192 receives the carrier tone and the weak signal impulses from the photocell 60 through circuit wires 195, and the exciter lamp 57 is energized from the preamplifier through a reduced-voltage circuit 196. The combined regulator-inverter 193 keeps the average signal level fairly constant within certain limits and inverts the signals to produce a positive record of the scanned copy. See, for example, Eller Patent 2,278,692. The output of preamplifier 192 goes into the regulator-inverter through wires 197 and the inverted signal output of unit 193 goes into the recording amplifier 194 through wires 198. The output of this amplifier energizes a transformer 199 which has a primary 200 connected to the amplifier 194 and a secondary 201 connected to the conductor 115 of the stylus circuit.

The volume output of the recording amplifier 194 is regulated by a potentiometer 202 which is connected through wires 203 to the grid of the first-stage tube in the amplifier. This is a well known expedient and requires no further explanation. We need only say that a rotary knob 204 (see Figs. 1 and 2) on casing 15 of the machine enables the operator to adjust the resistance of the potentiometer so that the recording marks made by the stylus 95 have the desired degree of sharpness. That is, the recording should be neither too dark nor too light and the potentiometer takes care of that. It is convenient to mount the potentiometer 202 on the bracket 175 near the starting button 173.

The three units 192, 193 and 194, which are housed in the cabinet 10 (Fig. 1), are connected in parallel to the bus bars A and B by conductors 205 and 206. Therefore, when the main switch 207 is closed, all three units are energized and remain so until the power is shut off, regardless of the various circuit controls that take place during the scanning cycles. The exciter lamp 57 which is connected to the amplifier 192 and the chopper motor 62 which is connected directly by wires 208 to bus bars A and B are also energized upon the closing of switch 207. Consequently, when the attendant throws the power switch on, the machine is automatically conditioned for operation.

The switch 178, which is operated by the scanning carriage SK at the end of its downward travel, is connected in series with a switch 209 which is controlled by the cover 38. Whereas the switch 178 is normally closed and is momentarily opened by the carriage SK in its final position, the switch 209 is normally open and is closed by the closing of cover 38. This means that the switch 209 remains closed as long as the cover is in closed position.

A simple way to mount the switch 209 in operative relation to the cover 38 is shown in Figs. 5 and 7. The switch 209 is carried by an angle bracket 210 which is secured to the underside of the top plate 48. A spring arm 211 on the switch 209 carries a button 212 arranged to extend upward through the top plate 48. When the cover 38 is thrown back (see Fig. 18), the arm 211 is in open position and the button 212 projects above the plate 48. When the cover is closed, a round stud 213 (such as a screw head) pushes the button 212 down and closes the switch 209.

Going back now to Fig. 21, it will be clear that the two series switches 209 and 178 are both closed only when the cover 38 is closed and when the scanning carriage SK is not in its final position. The purpose of this arrangement will presently appear. These series switches are connected in the power circuit A—B through a wire 214, switch 178, wire 215, switch 209 and wire 216 which goes to one side of a relay 217. A wire 218 connects the other side of relay 217 to one terminal of the starting switch 174. The other terminal of this switch goes to a wire 219 which joins a conductor 220 coming from the power main B.

The relay 217 has a pair of make contacts 221 and 222. The make contact 221 is connected in a line 223 which goes from bus bar A to a conductor 224. It will thus be seen that the drive motor 152, the clutch solenoid 164, and the lower motor 186 are all connected in shunt across the conductors 220 and 224. The conductor 220 goes directly to bus bar B but the other conductor 224 is connected to bus bar A through the normally open relay switch 221, so that the electric devices 152, 164 and 186 are not energized until the relay 217 is operated.

A relay 225 is connected in the circuit of conductors 220 and 224, whereby this relay is energized from the power source A—B when the relay 217 is operated. The relay 225 has a grounded break contact 226 which is connected by a wire 227 to one side of the secondary winding 201 of the output transformer 199. The other side of the secondary being grounded, it is evident that the recording stylus 95 is shorted through wire 227 and the grounded contact 226 as long as the relay 225 remains deenergized.

The energizing circuit of starting relay 217 when the push button 173 is pressed down can be traced from bus bar A through wire 214, switch 178, wire 215, switch 209 (when the cover 38 is closed), wire 216, through the winding of relay 217, wire 218, closed switch 174, wire 219 to wire 220, and from there to bus bar B. The relay 217 locks through its make contact 222, so that the push button need be held down only for a moment. The operation of relay 217 energizes not only the devices 152, 164 and 186, as already mentioned, but also the stylus shorting relay 225. The opening of contact 226 by the energizing of relay 225 removes the short circuit from the stylus 95 so that the latter is now operatively connected to the output transformer 199. As the switches 178 and 209 are connected in series in the circuit of relay 217, the opening of either switch deenergizes that relay.

The operation of our duplicator will be fully understood from the foregoing description of Fig. 21 but for a brief perusal we add the following summary.

Assuming that the power switch 207 is on and the cover 38 thrown back, the attendant inserts the rolled up sheets 35 and 36 into the cylinder 17. All he has to do now is close the cover 38 and press the button 173. This energizes the motor 152 and the clutch solenoid 164 to rotate the cylinder 17 and wind up the cord 134 whereby the scanning devices SK and RD are set in operation. The transmitting of copy on sheet 35 and its recording on sheet 36 now proceed automatically until the carriage SK reaches the end of its downward travel. Thereupon the switch 178 is opened to deenergize the relay 217 whereby the cylinder 17 stops, the power is taken off the stylus 95, and the scanning devices SK and RD are instantly returned to their normal positions. The attendant now opens the cover 38 and removes the sheets 35—36. The machine is ready for the next duplicating job.

The reason for taking the power off the stylus 95 when the machine is not scanning is to insure the safety of the attendant while he is busy at the machine after closing the power switch 207. It will be recalled that when the power switch is closed, the exciter lamp 57 and the chopper motor 62 of the scanning carriage SK as well as the electrical units 192, 193 and 194 are all instantly energized, so that a high voltage surges through the output transformer 199. The shorting contact 226 keeps this voltage off the stylus and the attendant is safe from shock if be should somehow come into contact with the stylus as when inspecting the recording head RD or inserting the paper into the cylinder.

It should be noted that the power is kept off the stylus 95 by grounding the secondary 201 of the output transformer 199 through the shorting contact 226. This means that the secondary circuit 201 of the signal output transformer is not opened to disconnect the stylus but remains grounded in shunt thereto. If that circuit were open during the non-scanning intervals of the machine and if the amplifier unit 194 happened to be of the type using pentode tubes, the latter would be burned out by the absence of a load on the plate circuit. Our novel means for taking the power off the stylus makes it possible to use any kind of amplifier whether using triodes or pentodes.

We have described our machine as a duplicator, that is to say, a combined transmitter and receiver, because it was primarily designed for that purpose. However, it is within the purview of our invention to operate the machine either as a transmitter or as a receiver, it being only necessary to have switch-over connections in the diagram of Fig. 21. Thus, for facsimile transmission to a distant receiver, the local recording connections would be cut out, and vice versa, as will be understood by those skilled in this art. In that case it would not matter that both of the scanning devices SK and RD would move up and down, for one would be idle without interfering with the active device.

The drawings of this application were made from an actual machine which represents a typical embodiment of our invention. It will be understood, then, that the details herein set forth are not to be regarded in a restrictive sense but rather as illustrative of the novel features that characterize our invention. Various changes and modifications are possible within the scope of the appended claims.

We claim as our invention:

1. A facsimile machine having a vertical sheet-holding cylinder rotatably mounted, two scanning devices associated with said cylinder and movable axially thereof, one of said devices being mounted outside the cylinder and the other device being mounted within the cylinder, means whereby said scanning devices are normally held at opposite ends of the cylinder, a cord connected to the scanning device inside the cylinder, a rotary member for winding up said cord to raise said inside device during a scanning operation, a second cord connecting the two scanning devices, and guide means for the second cord whereby the upward movement of the inside device pulls the other device down.

2. In a facsimile machine, a vertical cylinder adapted to support two nested sheets arranged back to back in cylindrical form so that the outer and inner surfaces of the nested sheets are exposed for scanning, a scanning device movable vertically along the outside of said cylinder to scan the outer surface of said sheets, a second scanning device mounted inside the cylinder for vertical movement therein to scan the inner surface of said sheets, a motor for rotating said cylinder during a scanning operation, and driving connections between said motor and said scanning devices for simultaneously moving said devices in opposite directions during the rotation of said cylinder.

3. In a facsimile duplicator, a vertical transparent cylinder mounted for rotation, said cylinder being adapted to hold inside thereof two nested sheets arranged back to back in cylindrical form so that the outer and inner surfaces of the nested sheets are exposed for scanning, said outer surface bearing copy to be duplicated and said inner surface being adapted to receive recording, an optical scanning device movable vertically along the outside of said cylinder to scan said outer copy surface, an electric recording device mounted inside the cylinder for vertical movement therein to record on said inner surface the copy scanned by said optical device, a rotary driving member connected with both of said devices for simultaneously moving the same along the cylinder at scanning speed, and driving connections for rotating said cylinder during a scanning operation.

4. In a facsimile duplicator, a transparent cylinder rotatably mounted and adapted to hold two nested sheets inside, the outer sheet bearing copy and the inner sheet being a recording blank, optical means outside the cylinder for scanning the outer copy sheet through the cylinder wall, electric means within the cylinder for scanning the inner sheet to record the copy scanned by said optical means, a mounting and guiding structure for both of said scanning means to locate, the optical scanning point and the electrical recording point in the same plane radial to the cylinder, and a motor for simultaneously operating said optical scanning means and said electric recording means.

5. A facsimile machine having a vertical rotary cylinder open at the top for the insertion and removal of a sheet which is held inside the cylinder for scanning, a fixed post extending through said cylinder, a scanning head slidable up and down on said post, said scanning head being normally positioned at the bottom of the cylinder, a pulley mounted on top of said post, a cord connected to the scanning head and passing over said pulley down through the cylinder the position of said post and the mounting of the cord on said pulley constituting an assembly which clears the cylinder opening for the insertion and removal of sheets, and means for winding up the lower end of the cord to lift the head for scanning while the cylinder rotates.

6. In a facsimile machine, a vertical rotary cylinder adapted to hold a sheet inside for scanning, a scanning head normally resting on a support at the lower end of the cylinder, a stylus pivotally mounted on said head and normally held in a retracted position, means including a cord for lifting said head to scan the sheet in the cylinder while the latter rotates, and means whereby the pull on said cord in lifting the head automatically moves the stylus into scanning contact with the sheet.

7. In a facsimile machine, a scanning head adapted to operate inside a sheet held in cylindrical form, a pin mounted on said head so as to have rotary and axial movements, a stylus-carrying arm fastened to said pin, a spring for normally holding said pin in a position to retract said arm, means whereby the axial movement of said pin against the spring turns the pin and swings the stylus arm outwardly to bring the stylus into contact with the inner surface of the sheet, and means connected to said pin for moving the stylus into sheet engaging position and operating said scanning head.

8. In a facsimile machine, a rotary cylinder adapted to hold a sheet inside for scanning, a bar extending through said cylinder, a scanning head slidably mounted on said bar and carrying an electric stylus for scanning said sheet, an insulated conductive strip carried by said bar, said strip being connected in the recording circuit of the stylus, and an insulated contact piece carried by the scanning head and arranged to engage said strip in continuous contact during the movements of the head, said contact piece being electrically connected to said stylus.

9. In a facsimile machine, a vertical cylinder open on top for the insertion of a sheet to be scanned, a scanning head mounted within the cylinder and movable vertically therein, and a dome-like top carried by said scanning head and provided with a conical base portion which flares outward for guiding the inserted sheet toward the cylinder wall.

10. In a facsimile machine, a rotatable copy-holding cylinder provided with an inner ring at the base and with an inner friction ring at the other end, said base ring being adapted to engage the inner edge of an inserted sheet and holding the same against the cylinder wall, and a sheet holding device removably mounted at said other end of the cylinder and rotatable therewith, said device having a circular contact surface arranged to press the adjacent end of the sheet against said friction ring during rotation of the cylinder, whereby the inserted sheet is firmly held at both ends during scanning.

11. In a facsimile machine, a vertical scanning cylinder mounted at the base for rotation and open at the top for the insertion of a sheet, a movable cover for said cylinder, and a split ring loosely carried by said cover and arranged to rest on top of the cylinder when the cover is closed, whereby the ring rotates with the cylinder, said split ring comprising a plurality of arcuate sections which extend into the cylinder and expand upon rotation to press the top edge of the inserted sheet against the cylinder wall.

12. In a facsimile machine, a cylinder of insulating material adapted to support an inserted sheet for inside scanning by an electric stylus, a rotary mounting for the base of said cylinder, a metal ring secured inside the cylinder at its base end to contact the inner edge of the inserted sheet, a second metal ring arranged at the other end of the cylinder and rotatable therewith to contact the other edge of the inserted sheet, both of said metal rings being grounded so that the supported sheet is grounded at both edges for the electric recording operation, and a movable support for the second ring for removing this ring from the cylinder end to permit the insertion and removal of the sheets.

13. In a facsimile machine, a vertical scanning cylinder mounted on a rotary base, reciprocable scanning mechanism operatively associated with said cylinder, an electric motor mounted with its shaft vertical, gears for connecting the upper end of the motor shaft with said rotary base, and driving connections between the lower end of said shaft and said scanning mechanism, said drive connections being independent of said gears.

14. In a facsimile machine, a vertical scanning cylinder mounted on a rotary base, reciprocable scanning mechanism operatively associated with the cylinder, an electric motor mounted with its shaft vertical, a gear drive between the upper end of the motor shaft and said rotary base, separable driving connections between the lower end of said shaft and said scanning mechanism, said driving connections being independent of said gear drive, and electrically operated means whereby said mechanism automatically breaks said driving connections at the end of a scanning operation.

15. In a facsimile machine, a vertical cylinder mounted at its base for rotation and open at the top for the insertion of sheets to be scanned, a scanning head mounted within said cylinder for vertical movement and normally positioned at the bottom of the cylinder, and a windlass arrangement for hoisting said head to scan the inserted sheet while the cylinder rotates, said windlass arrangement including a cord supported to run up and down within the cylinder in a position that permits the insertion and removal of sheets.

16. In a facsimile machine, a vertical cylinder mounted at its base for rotation and open on top for the insertion of sheets to be scanned, a scanning head mounted within said cylinder for vertical movement and normally positioned at the bottom of the cylinder, a windlass arrangement for hoisting said head to scan the inserted sheet while the cylinder rotates, and a single electric motor having connections for simultaneously rotating the cylinder and operating said hoisting arrangement.

17. In a facsimile machine, a vertical scanning cylinder mounted on a rotary base said cylinder being open at the top for the insertion and removal of sheets, a fixed vertical post extending through said cylinder and carrying a pulley on top, a scanning head slidably mounted on said post within said cylinder, a rotary drum arranged below said post, a cord attached at one end to said scanning head and at the other end to said drum, said cord passing over said pulley whereby operation of the drum winds up the cord and moves the head up for scanning while the cylinder rotates, the up and down runs of said cord within the cylinder being positioned to permit the insertion and removal of sheets, and means for simultaneously operating said drum and cylinder.

18. In a facsimile machine for vertical scanning, a pair of horizontal plates vertically spaced and providing circular bearings in axial alignment, a base rotatably supported on the lower plate, said rotary base including a hub journaled in the bearing of the lower plate, a vertical scanning cylinder mounted in said hub, a ring fixed to the upper end of said cylinder and journaled in the bearing of the top plate, a gear mounted on said hub, a motor supported with its shaft vertical, and a pinion on the upper end of the motor shaft meshing with said gear to rotate the cylinder at predetermined scanning speed.

19. In a facsimile machine, a vertical rotary cylinder adapted to support sheets for scanning, a scanning head mounted outside the cylinder and a second scanning head mounted inside the cylinder, said scanning heads having each a normal position with respect to the cylinder and being movable vertically for scanning, a cord attached to one of said scanning heads, a rotary drum for winding up said cord, a motor for operating said drum, a second cord for connecting the two heads together so that the operation of said drum to wind up the first cord actuates both heads simultaneously for their respective scanning movements during rotation of the cylinder, and means controlled by one of said heads at the end of its path of travel for automatically disconnecting the drum from the motor to permit the return of both heads to their normal positions.

20. In a facsimile machine, a vertical rotary cylinder for holding copy to be scanned, reciprocable scanning mechanism operatively associated with said cylinder, a shaft having a drum loosely mounted thereon, a coupling member on said shaft movable into and out of driving engagement with said drum, a cord connecting said scanning mechanism with said drum so that rotation of the drum winds up the cord and operates said mechanism from normal to final position, an electric motor, driving connections between said motor and cylinder for rotating the latter at high scanning speed, other driving connections between said motor and coupling member to rotate the drum at low speed during a scanning operation, automatic means controlled by said scanning mechanism in final position for operating said coupling member to disconnect the drum from the motor after each scanning operation, and means responsive to the uncoupling of said drum to return said scanning mechanism from final to start position, the return of said mechanism being permitted by the unwinding of the cord from the uncoupled drum.

21. In a facsimile machine, a cylinder for supporting a sheet to be scanned, an electric stylus for scanning the supported sheet, a power circuit for said stylus, said circuit including the secondary of a transformer, and means for automatically short-circuiting said secondary at the end of a scanning operation to take the power off the stylus.

22. A facsimile machine having a vertical scanning cylinder, a motor for rotating said cylinder, a movable cover for said cylinder, a relay having a contact which holds the motor circuit open until the relay is energized, a starting switch for energizing said relay, and another switch for preventing the operation of said relay unless said cover is closed.

23. In a facsimile machine, a rotary cylinder adapted to hold a sheet inside for scanning, a fixed post extending lengthwise in said cylinder, a scanning device slidably supported on said post and including an electric stylus arranged to engage a sheet in the cylinder, means for moving said device along the post during a scanning operation, and slidably engaging contact members carried by said post and scanning device for maintaining said stylus in circuit during its scanning movement inside the cylinder.

24. In a facsimile machine, a vertical cylinder rotatably mounted and open at the top for the insertion of sheets to be scanned, an electric motor for rotating said cylinder, reciprocable scanning mechanism associated with said cylinder and operated by said motor, a movable cover for said cylinder, a normally open switch automatically closed by the closing of the cover, a second switch in series with said first switch, said second switch being normally closed and arranged to be opened by said scanning mechanism at the end of its forward travel, a relay having a normally open contact in the circuit of said motor, the circuit of said relay including said two switches in series, and a starting switch to energize said relay to operate said motor which stops when either one of said series switches is opened.

25. A facsimile transmitter-recorder having a rotatable hollow cylinder for holding two sheets of paper back to back in nested cylindrical form, the exposed surface of one sheet bearing copy to be transmitted and the exposed surface of the other sheet being adapted to receive a facsimile record of the transmitted copy, a scanning device mounted outside the cylinder and a second scanning device mounted within the cylinder, one of said devices being adapted to scan said copy bearing surface and the other device being adapted to scan said record receiving surface, means for simultaneously operating said devices in scanning relation to said cylinder, and means for operatively connecting said devices to produce a facsimile duplicate of the scanned copy on said recording paper.

26. A facsimile transmitter-recorder having a rotatable transparent cylinder for supporting therein two nested sheets back to back, the exposed surface of the outer sheet bearing copy to be transmitted and the exposed surface of the inner sheet being blank for recording thereon the scanned copy, an optical device mounted outside the cylinder for scanning said copy surface, an electric stylus mounted within the cylinder for scanning said blank surface, means for simultaneously operating said optical device and said stylus in scanning relation to said cylinder, and means for operatively connecting said optical device with said stylus to cause the latter to record the scanned copy on said blank surface.

FERNAND E. D'HUMY.
HOWARD P. CORWITH.
ROBERT D. PARROTT.
FREDERICK L. O'BRIEN.

REFERENCES CITED

The following references are of record in the file of this patent:

UNITED STATES PATENTS

| Number | Name | Date |
|---|---|---|
| 882,329 | Lieb | Mar. 17, 1908 |
| 893,277 | Stuart | July 14, 1908 |
| 1,142,384 | Tiffany | June 8, 1915 |
| 1,613,970 | Tanner | Jan. 11, 1927 |
| 1,929,485 | Delchef | Oct. 10, 1933 |
| 2,096,445 | Begun | Oct. 19, 1937 |
| 2,179,002 | Washington | Nov. 7, 1939 |
| 2,213,876 | Young | Sept. 3, 1940 |
| 2,229,293 | Huntley | Jan. 21, 1941 |
| 2,260,862 | O'Brien | Oct. 28, 1941 |
| 2,262,715 | Wise | Nov. 11, 1941 |
| 2,283,944 | Parrott et al. | May 26, 1942 |
| 2,301,024 | D'Humy | Nov. 3, 1942 |
| 2,311,803 | Wise | Feb. 23, 1943 |
| 2,312,328 | Finch | Mar. 2, 1943 |
| 2,315,361 | Wise | Mar. 30, 1943 |
| 2,365,741 | Wise | Dec. 26, 1944 |
| 2,386,263 | Ridings | Oct. 9, 1945 |
| 2,393,329 | Mample | Jan. 22, 1946 |

FOREIGN PATENTS

| Number | Country | Date |
|---|---|---|
| 326,937 | Great Britain | Mar. 27, 1930 |
| 549,849 | Germany | May 2, 1932 |